(12) United States Patent  (10) Patent No.: US 7,436,469 B2
Gehlsen et al.  (45) Date of Patent: Oct. 14, 2008

(54) COMPOSITE DIFFUSER PLATES AND DIRECT-LIT LIQUID CRYSTAL DISPLAYS USING SAME

(75) Inventors: Mark D. Gehlsen, Eagan, MN (US); Chingwen Chen, Taoyuan (TW); Byungsoo Ko, Hwasugn (KR); Robert M. Emmons, St. Paul, MN (US); James W. Laumer, White Bear Lake, MN (US); Ryan T. Fabick, St. Paul, MN (US); Linda M. Rivard, Stillwater, MN (US); Kenneth A. Epstein, St. Paul, MN (US); Youngsoo Park, Suwon (KR); Chideuk Kim, Sungnam (KR); James A. Stevenson, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 251 days.

(21) Appl. No.: 10/965,937

(22) Filed: Oct. 15, 2004

(65) Prior Publication Data

US 2006/0082700 A1   Apr. 20, 2006

(51) Int. Cl.
    *G02F 1/1335*  (2006.01)
(52) U.S. Cl. ............... 349/62; 349/63; 349/64; 349/65
(58) Field of Classification Search ........... 349/62–65
    See application file for complete search history.

(56) References Cited

U.S. PATENT DOCUMENTS

| | | | |
|---|---|---|---|
| 3,655,263 A | 4/1972 | Hoffman et al. | |
| 4,415,509 A | 11/1983 | Toyooka et al. | |
| 5,112,722 A | 5/1992 | Tsujino et al. | |
| 5,269,977 A | 12/1993 | Nakahashi et al. | |
| 5,592,047 A | 1/1997 | Park et al. | |
| 5,914,560 A | 6/1999 | Winsor | |
| 6,153,289 A | 11/2000 | Murray | |
| 6,282,821 B1 | 9/2001 | Freler et al. | |
| 6,288,172 B1 | 9/2001 | Goetz et al. | |
| 6,341,879 B1 * | 1/2002 | Skinner et al. | ............... 362/295 |
| 6,343,865 B1 | 2/2002 | Suzuki | |
| 6,368,699 B1 | 4/2002 | Gilbert et al. | |
| 6,597,418 B2 * | 7/2003 | Moon et al. | ............... 349/98 |

(Continued)

FOREIGN PATENT DOCUMENTS

JP  6-347764  12/1994

(Continued)

*Primary Examiner*—David C. Nelms
*Assistant Examiner*—Phu Vu
(74) *Attorney, Agent, or Firm*—Jay R. Pralle

(57) ABSTRACT

In a directly-illuminated liquid crystal display (LCD), for example an LCD monitor or an LCD-TV, a number of light management layers lie between the light source and the LCD panel to provide bright, uniform illumination. The light management layers, including, for example, a diffuser, a reflective polarizer and a brightness enhancing layer, are contained in a light management unit that is formed from two subassemblies. The two subassemblies each contain a substrate and are attached together so as to leave a gap between the two subassemblies. The diffuser is located in one of the subassemblies, and the other light management layers may be in either of the subassemblies, or may be disposed in the gap between the subassemblies.

38 Claims, 25 Drawing Sheets

U.S. PATENT DOCUMENTS

| | | |
|---|---|---|
| 6,636,363 B2 | 10/2003 | Kaminsky et al. |
| 6,692,137 B2 | 2/2004 | Blanchard |
| 6,706,339 B1 | 3/2004 | Miyatake et al. |
| 6,723,392 B1 | 4/2004 | Jinnal et al. |
| 6,771,335 B2 * | 8/2004 | Kimura et al. ............... 349/112 |
| 6,831,714 B2 * | 12/2004 | Masaki et al. ............... 349/112 |
| 6,846,089 B2 | 1/2005 | Stevenson et al. |
| 6,861,121 B2 | 3/2005 | Matsunaga et al. |
| 7,072,096 B2 * | 7/2006 | Holman et al. ............... 359/298 |
| 7,232,594 B2 | 6/2007 | Miroshin et al. |
| 2001/0008681 A1 | 7/2001 | Savant |
| 2001/0036546 A1 | 11/2001 | Kaytor et al. |
| 2003/0017281 A1 | 1/2003 | Mizutani et al. |
| 2003/0118805 A1 | 6/2003 | Kretman et al. |
| 2003/0164914 A1 * | 9/2003 | Weber et al. ............... 349/115 |
| 2003/0223216 A1 | 12/2003 | Emmons et al. |
| 2004/0061812 A1 | 4/2004 | Maeda |
| 2004/0246697 A1 | 12/2004 | Yamashita et al. |
| 2006/0029784 A1 | 2/2006 | Doan et al. |

FOREIGN PATENT DOCUMENTS

| | | |
|---|---|---|
| JP | 10-048430 | 2/1998 |
| JP | 11-258411 | 9/1999 |
| JP | 15172931 | 6/2003 |
| JP | 16029694 | 1/2004 |
| JP | 2004-045472 | 2/2004 |
| WO | WO 96/31794 | 10/1996 |
| WO | WO 99/56158 | 11/1999 |
| WO | WO 01/47711 | 7/2001 |
| WO | WO 03/034104 | 4/2003 |

* cited by examiner

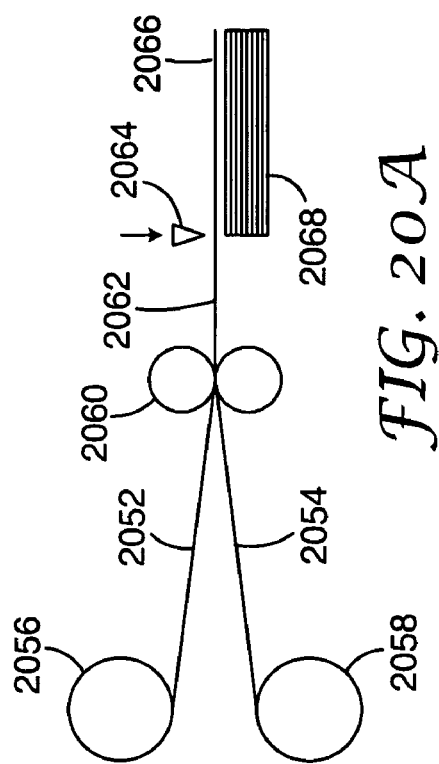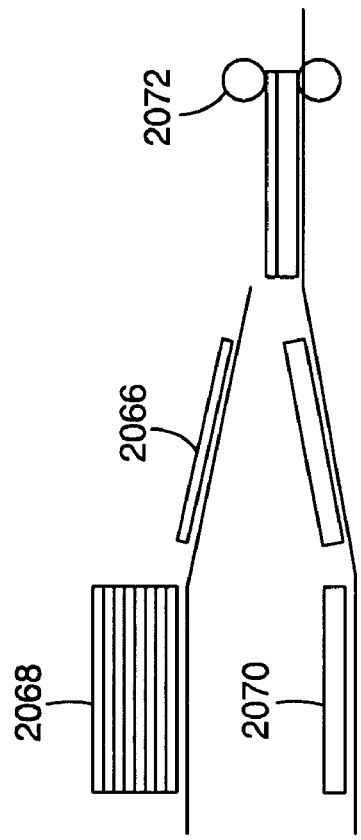
FIG. 20A
FIG. 20B
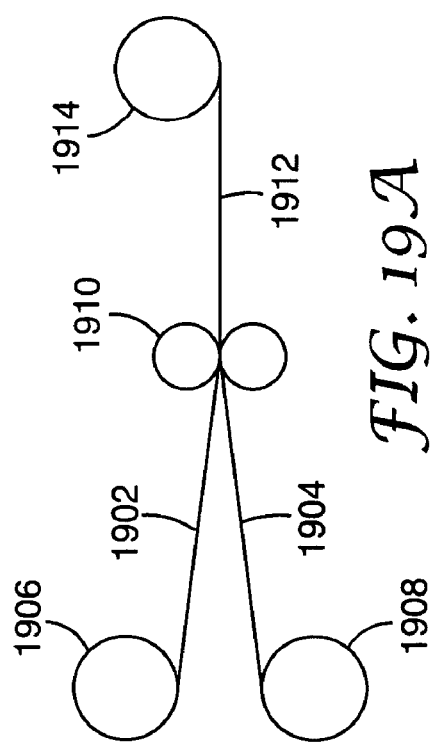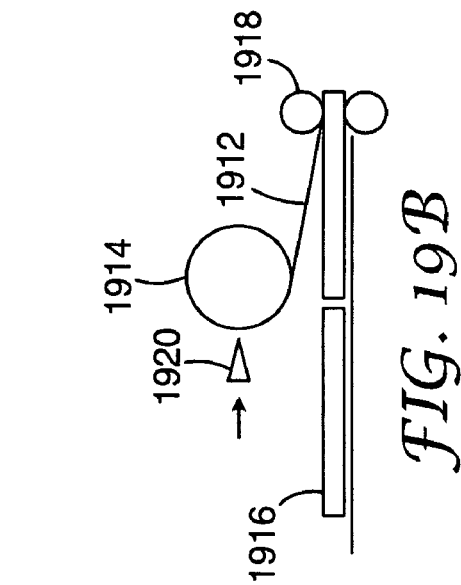
FIG. 19A
FIG. 19B

US 7,436,469 B2

COMPOSITE DIFFUSER PLATES AND DIRECT-LIT LIQUID CRYSTAL DISPLAYS USING SAME

FIELD OF THE INVENTION

The invention relates to optical displays, and more particularly to liquid crystal displays (LCDs) that are directly illuminated by light sources from behind, such as may be used in LCD monitors and LCD televisions.

BACKGROUND

Liquid crystal displays (LCDs) are optical displays used in devices such as laptop computers, hand-held calculators, digital watches and televisions. Some LCDs include a light source that is located to the side of the display, with a light guide positioned to guide the light from the light source to the back of the LCD panel. Other LCDs, for example some LCD monitors and LCD televisions (LCD-TVs) are directly illuminated using a number of light sources positioned behind the LCD panel. This arrangement is increasingly common with larger displays, because the light power requirements, to achieve a certain level of display brightness, increase with the square of the display size, whereas the available real estate for locating light sources along the side of the display only increases linearly with display size. In addition, some LCD applications, such as LCD-TVs, require that the display be bright enough to be viewed from a greater distance than other applications, and the viewing angle requirements for LCD-TVs are generally different from those for LCD monitors and hand-held devices.

Some LCD monitors and most LCD-TVs are commonly illuminated from behind by a number of cold cathode fluorescent lamps (CCFLs). These light sources are linear and stretch across the full width of the display, with the result that the back of the display is illuminated by a series of bright stripes separated by darker regions. Such an illumination profile is not desirable, and so a diffuser plate is used to smooth the illumination profile at the back of the LCD device.

Currently, LCD-TV diffuser plates employ a polymeric matrix of polymethyl methacrylate (PMMA) with a variety of dispersed phases that include glass, polystyrene beads, and $CaCO_3$ particles, or blends thereof. These plates often deform or warp after exposure to the elevated temperatures of the lamps. In addition, some diffusion plates are provided with a diffusion characteristic that varies across its width, in an attempt to make the illumination profile at the back of the LCD panel more uniform. Such non-uniform diffusers are sometimes referred to as printed pattern diffusers. They are expensive to manufacture, since the diffusing pattern must be registered to the illumination source. In addition, the diffusion plates require customized extrusion compounding to distribute the diffusing particles uniformly throughout the polymer matrix, which further increases costs.

SUMMARY OF THE INVENTION

One embodiment of the invention is directed to a light management unit for use between a light source and a liquid crystal display panel. The light management unit has a first optical subassembly and a second optical subassembly. The first optical subassembly comprises at least a first substrate and one or more diffusing elements. The second optical subassembly comprises at least a second substrate and is mounted to the first subassembly in such a manner as to produce a gap between the first and second optical subassemblies.

Another embodiment of the invention is directed to a display system having a backlight and a liquid crystal display (LCD) panel comprising upper and lower plates and a liquid crystal layer disposed between the upper and lower plates. A light management unit is disposed between the backlight and the LCD panel and has a first optical subassembly comprising a first substrate and a second optical subassembly comprising a second substrate. The second optical subassembly is mounted to the first subassembly in such a manner as to produce a gap between the first and second optical subassemblies. The light management unit diffuses light passing from the backlight to the LCD panel.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIGS. 19A and 19B schematically present one embodiment of an arrangement for fabricating a subassembly according to principles of the present invention;

FIGS. 20A and 20B schematically present another embodiment of an arrangement for fabricating a subassembly according to the present invention;

Figure 1:
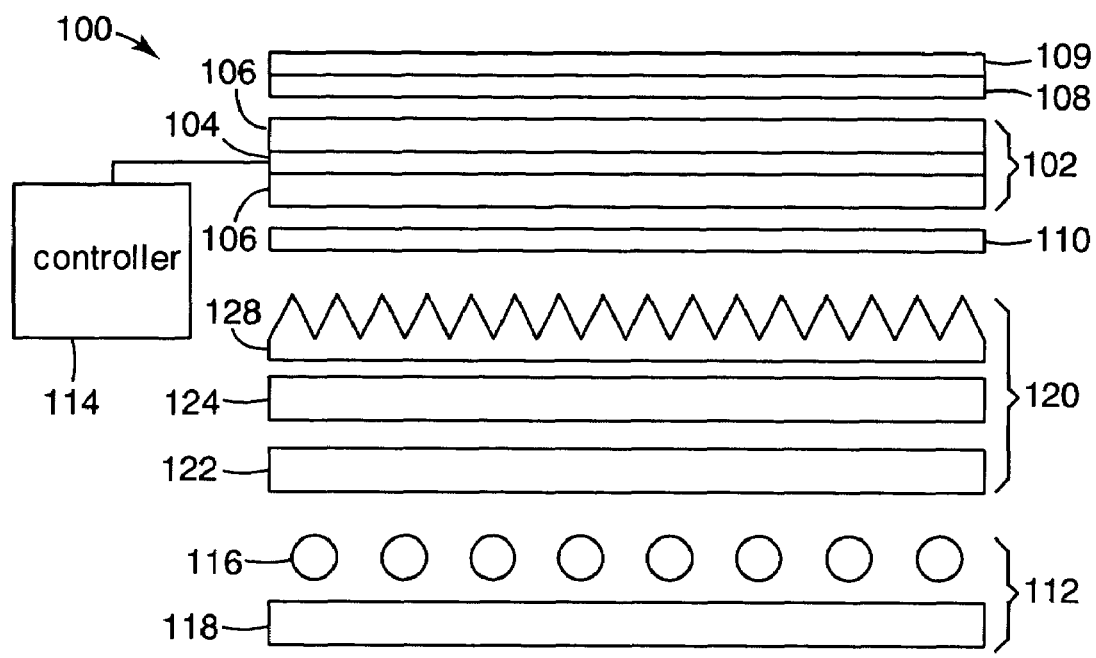
FIG. 1 schematically illustrates a back-lit liquid crystal display device that is capable of using a diffuser plate according to principles of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to liquid crystal displays (LCDs, or LC displays), and is particularly applicable to LCDs that are directly illuminated from behind, for example as are used in LCD monitors and LCD televisions (LCD-TVs).

The diffuser plates currently used in LCD-TVs are based on a polymeric matrix, for example polymethyl methacrylate (PMMA), polycarbonate (PC), or cyclo-olefins, formed as a rigid sheet. The sheet contains diffusing particles, for example, organic particles, inorganic particles or voids (bubbles). These plates often deform or warp after exposure to the elevated temperatures of the light sources used to illuminate the display. These plates also are expensive to manufacture and to assemble in the final display device.

The invention is directed to a directly-illuminated LCD device that has an arrangement of light management layers positioned between the LCD panel and the light source. In some embodiments, one or more of the light management layers are included in a light management unit that is formed from two optical subassemblies attached together with a gap therebetween. Each optical subassembly includes a supporting layer, often referred to as a substrate, may also include one or more light management layers. The substrates may be organic or inorganic substrates. The light management units are used to provide various optical functions, such as diffusion, polarization and gain (on-axis brightness enhancement), to light that passes from the light source to the LCD panel.

Light management units of the present invention are simple to manufacture and provide a high degree of flexibility in the materials and processes used in manufacturing. Combining the various functions of the light management unit into a single, integrated optical unit allows for superior optical designs. In contrast, the conventional approach is to provide different light management functions in different elements: optimization of each of these separate elements doe not often lead to the best overall system design.

In a light management unit according to some embodiments of the present invention, the structural and optical requirements may be separated: the substrate provides structural performance and one or more attached diffuser layers provide the optical performance. By separating these functions, the cost advantages of using common transparent materials and common diffuser sheets can be exploited, to reduce overall costs. This also permits the introduction of warp resistant plates, for example glass plates, at low cost. In addition, it is easier to control the diffusion properties more precisely when the diffuser is contained in a layer separate from the plate. Also, patterned diffuser films can be used at significantly less expense than with patterned, rigid, bulk diffuser plates.

A schematic exploded view of an exemplary embodiment of a direct-lit LC display device 100 is presented in FIG. 1. Such a display device 100 may be used, for example, in an LCD monitor or LCD-TV. The display device 100 is based on the use of an LC panel 102, which typically comprises a layer of LC 104 disposed between panel plates 106. The plates 106 are often formed of glass, and may include electrode structures and alignment layers on their inner surfaces for controlling the orientation of the liquid crystals in the LC layer 104. The electrode structures are commonly arranged so as to define LC panel pixels, areas of the LC layer where the orientation of the liquid crystals can be controlled independently of adjacent areas. A color filter may also be included with one or more of the plates 106 for imposing color on the image displayed.

An upper absorbing polarizer 108 is positioned above the LC layer 104 and a lower absorbing polarizer 110 is positioned below the LC layer 104. In the illustrated embodiment, the upper and lower absorbing polarizers are located outside the LC panel 102. The absorbing polarizers 108, 110 and the LC panel 102 in combination control the transmission of light from the backlight 112 through the display 100 to the viewer. In some LC displays, the absorbing polarizers 108, 110 may be arranged with their transmission axes perpendicular. When a pixel of the LC layer 104 is not activated, it may not change the polarization of light passing therethrough. Accordingly, light that passes through the lower absorbing polarizer 110 is absorbed by the upper absorbing polarizer 108, when the absorbing polarizers 108, 110 are aligned perpendicularly. When the pixel is activated, on the other hand, the polarization of the light passing therethrough is rotated, so that at least some of the light that is transmitted through the lower absorbing polarizer 110 is also transmitted through the upper absorbing polarizer 108. Selective activation of the different pixels of the LC layer 104, for example by a controller 114, results in the light passing out of the display at certain desired locations, thus forming an image seen by the viewer. The controller may include, for example, a computer or a television controller that receives and displays television images. One or more optional layers 109 may be provided over the upper absorbing polarizer 108, for example to provide mechanical and/or environmental protection to the display surface. In one exemplary embodiment, the layer 109 may include a hardcoat over the absorbing polarizer 108.

It will be appreciated that some type of LC displays may operate in a manner different from that described above. For example, the absorbing polarizers may be aligned parallel and the LC panel may rotate the polarization of the light when in an unactivated state. Regardless, the basic structure of such displays remains similar to that described above.

The backlight 112 includes a number of light sources 116 that generate the light that illuminates the LC panel 102. The light sources 116 used in a LCD-TV or LCD monitor are often linear, cold cathode, fluorescent tubes that extend across the display device 100. Other types of light sources may be used, however, such as filament or arc lamps, light emitting diodes (LEDs), flat fluorescent panels or external fluorescent lamps. This list of light sources is not intended to be limiting or exhaustive, but only exemplary.

The backlight 112 may also include a reflector 118 for reflecting light propagating downwards from the light sources 116, in a direction away from the LC panel 102. The reflector 118 may also be useful for recycling light within the display device 100, as is explained below. The reflector 118 may be a specular reflector or may be a diffuse reflector. One example of a specular reflector that may be used as the reflector 118 is Vikuiti™ Enhanced Specular Reflection (ESR) film available from 3M Company, St. Paul, Minn. Examples of suitable diffuse reflectors include polymers, such as PET, PC, PP, PS loaded with diffusely reflective particles, such as titanium dioxide, barium sulphate, calcium carbonate or the like. Other examples of diffuse reflectors, including microporous materials and fibril-containing materials, are discussed in co-owned U.S. Patent Application Publication 2003/0118805 A1, incorporated herein by reference.

An arrangement 120 of light management layers is positioned between the backlight 112 and the LC panel 102. The light management layers affect the light propagating from backlight 112 so as to improve the operation of the display device 100. For example, the arrangement 120 of light management layers may include a diffuser 122. The diffuser 122 is used to diffuse the light received from the light sources, which results in an increase in the uniformity of the illumination light incident on the LC panel 102. Consequently, this results in an image perceived by the viewer that is more uniformly bright.

The arrangement 120 of light management layers may also include a reflective polarizer 124. The light sources 116 typically produce unpolarized light but the lower absorbing polarizer 110 only transmits a single polarization state, and so about half of the light generated by the light sources 116 is not transmitted through to the LC layer 104. The reflecting polarizer 124, however, may be used to reflect the light that would otherwise be absorbed in the lower absorbing polarizer, and so this light may be recycled by reflection between the reflecting polarizer 124 and the reflector 118. At least some of the light reflected by the reflecting polarizer 124 may be depolarized, and subsequently returned to the reflecting polarizer 124 in a polarization state that is transmitted through the reflecting polarizer 124 and the lower absorbing polarizer 110 to the LC layer 104. In this manner, the reflecting polarizer 124 may be used to increase the fraction of light emitted by the light sources 116 that reaches the LC layer 104, and so the image produced by the display device 100 is brighter.

Any suitable type of reflective polarizer may be used, for example, multilayer optical film (MOF) reflective polarizers; diffusely reflective polarizing film (DRPF), such as continuous/disperse phase polarizers, wire grid reflective polarizers or cholesteric reflective polarizers.

Both the MOF and continuous/disperse phase reflective polarizers rely on the difference in refractive index between at least two materials, usually polymeric materials, to selectively reflect light of one polarization state while transmitting light in an orthogonal polarization state. Some examples of MOF reflective polarizers are described in co-owned U.S. Pat. No. 5,882,774, incorporated herein by reference. Commercially available examples of a MOF reflective polarizers include Vikuiti™ DBEF-D200 and DBEF-D440 multilayer reflective polarizers that include diffusive surfaces, available from 3M Company, St. Paul, Minn.

Examples of DRPF useful in connection with the present invention include continuous/disperse phase reflective polarizers as described in co-owned U.S. Pat. No. 5,825,543, incorporated herein by reference, and diffusely reflecting multilayer polarizers as described in e.g. co-owned U.S. Pat. No. 5,867,316, also incorporated herein by reference. Other suitable types of DRPF are described in U.S. Pat. No. 5,751,388.

Some examples of wire grid polarizers useful in connection with the present invention include those described in U.S. Pat. No. 6,122,103. Wire grid polarizers are commercially available from, inter alia, Moxtek Inc., Orem, Utah.

Some examples of cholesteric polarizer useful in connection with the present invention include those described in, for example, U.S. Pat. No. 5,793,456, and U.S. Patent Publication No. 2002/0159019. Cholesteric polarizers are often provided along with a quarter wave retarding layer on the output side, so that the light transmitted through the cholesteric polarizer is converted to linear polarization.

The arrangement 120 of light management layers may also include a brightness enhancing layer 128. A brightness enhancing layer is one that includes a surface structure that redirects off-axis light in a direction closer to the axis of the display. This increases the amount of light propagating on-axis through the LC layer 104, thus increasing the brightness of the image seen by the viewer. One example is a prismatic brightness enhancing layer, which has a number of prismatic ridges that redirect the illumination light, through refraction and reflection. Examples of prismatic brightness enhancing layers that may be used in the display device include the Vikuiti™ BEFII and BEFIII family of prismatic films available from 3M Company, St. Paul, Minn., including BEFII 90/24, BEFII 90/50, BEFIIIM 90/50, and BEFIIIT.

The diffuser and one or more other light management layers may be included in a light management unit disposed between the backlight and the LCD panel. The light management unit comprises a stack of attached layers and provides a stable structure for holding the diffuser and the one or other light management layers. The structure is less prone to warping than conventional diffuser plates. Also, the ability to supply a display manufacturer with a light management unit that contains a diffuser plate and one or more other light management layers as a single integrated unit results in simplified assembly of the display.

Figure 2A:
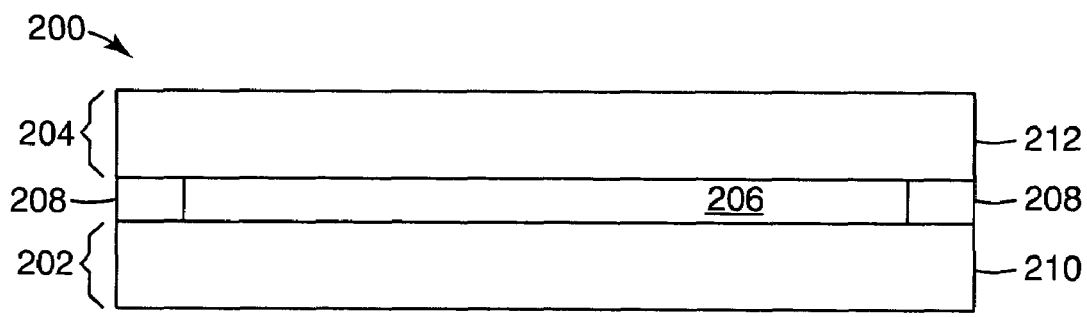
FIGS. 2A-2E schematically illustrate embodiments of light management units according to principles of the present invention.

Several different exemplary embodiments of light management unit are schematically shown in cross-sectional views in FIGS. 2A-2E. In FIG. 2A, a light management unit 200 comprises a first optical subassembly 202 and a second optical subassembly 204 separated by a gap 206. In the illustrated embodiment, a spacer 208 is disposed between the first optical subassembly 202 and the second optical subassembly 204 to separate the first and second optical subassemblies 202 and 204, resulting in the gap 206. In some exemplary embodiments, the spacer 208 is disposed around the edge of the unit 200, so that the light from the backlight passes through the gap 206 rather than the spacer 208. In addition, in some exemplary embodiments, the spacer 208 may act as a seal around the gap 206, to avoid the ingress of dust and the like into the gap 206.

A number of different optical layers, including a diffuser, a brightness enhancing layer and a reflective polarizer may be included in the first and/or second subassemblies. The following description discusses a number of different embodiments of light management unit in which the diffuser, brightness enhancing layer and/or reflective polarizer are located at different positions in the first or second subassemblies.

An optical subassembly comprises at least one optical layer, and the optical layers are attached together where there are two or more layers. The first subassembly 202 itself may include a number of different layers or optical sheets attached together, such as a diffuser, a brightness enhancing layer and/or a reflective polarizer layer. In the exemplary embodiment illustrated in FIG. 2A, the first subassembly 202 comprises a diffusive substrate plate 210, sometimes referred to as a diffuser plate. The diffusive substrate 210 may be a bulk diffuser plate formed from a polymer material that incorporates diffusing particles throughout its thickness. The polymer material may be any suitable polymer, such as those listed below. The diffusing particles may be any type of particle useful for diffusing light, for example transparent particles whose refractive index is different from the surrounding polymer matrix, diffusely reflective particles, or voids or bubbles in the matrix. Examples of suitable diffusely reflecting particles include particles of titanium dioxide ($TiO_2$), calcium carbonate ($CaCO_3$), barium sulphate ($BaSO_4$) and the like. The diffusing particles may be distributed with uniform or graded concentration throughout the plate, or may be patterned, for example, to provide greater diffusion above a light source and less diffusion between light sources, for improved uniformity.

The second subassembly 204 contains one or more layers attached together. In one embodiment, the second subassembly 204 includes a substrate 212. The attachment of one subassembly to another results in an I-beam structure that is relatively strong and resistant to bending. This structure also provides an insulating layer of air that may assist in lowering the cavity temperature on the opposite side of the bulb surface.

Figure 2B:
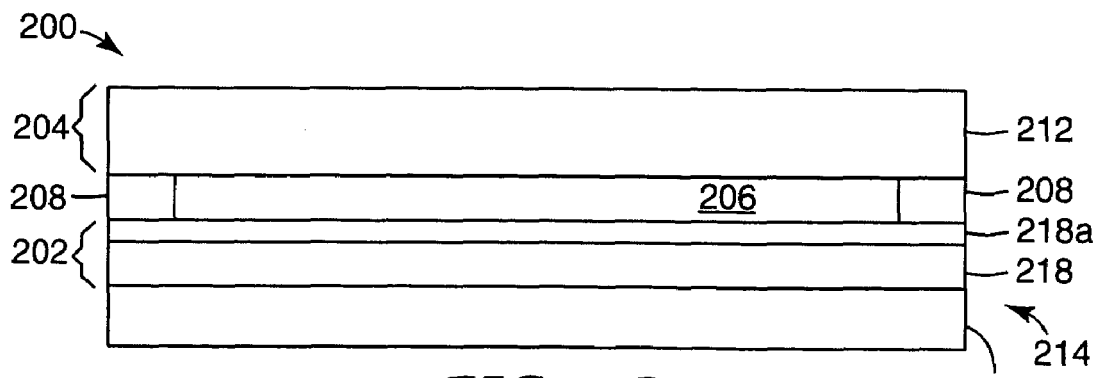

Another configuration of first subassembly 202 includes a substantially transparent substrate 216 with an attached diffuser layer 218, as is schematically illustrated in FIG. 2B. The substrates 212, 216 may be made of any material that is substantially transparent to visible light, for example, organic or inorganic materials, including glasses and polymers. The substrates 212, 216 of the different subassemblies need not be made of the same material. Suitable glasses include float glasses, i.e. glasses made using a float process, or LCD quality glasses, referred as LCD glass, whose characteristic properties, such as thickness and purity, are better controlled than float glass. Suitable polymer materials may be amorphous or semi-crystalline, and may include homopolymer, copolymer or blends thereof. Polymer foams may also be used. Example polymer materials include, but are not limited to, amorphous polymers such as poly(carbonate) (PC); poly(styrene) (PS); acrylates, for example acrylic sheets as supplied under the ACRYLITE® brand by Cyro Industries, Rockaway, N.J.; acrylic copolymers such as isooctyl acrylate/acrylic acid; poly(methylmethacrylate) (PMMA); PMMA copolymers; cycloolefins and cycoolefin copolymers; acrylonitrile butadiene styrene (ABS); styrene acrylonitrile copolymers (SAN); epoxies; poly(vinylcyclohexane); PMMA/poly(vinylfluoride) blends; atactic poly(propylene); poly(phenylene oxide) alloys; styrenic block copolymers; polyimide; polysulfone; poly(vinyl chloride); poly(dimethyl siloxane) (PDMS); polyurethanes; poly(carbonate)/aliphatic PET blends; and semicrystalline polymers such as poly(ethylene); poly(propylene); poly(ethylene terephalate) (PET); poly(ethylene naphthalate) (PEN); polyamide; ionomers; vinyl acetate/polyethylene copolymers; cellulose acetate; cellulose acetate butyrate; fluoropolymers; poly(styrene)-poly(ethylene) copolymers; and PET and PEN copolymers.

A substrate is a sheet of material that is self-supporting, and is used to provide support to the layers to which it is attached. While each of the layers in stack of attached layers contributes to the stiffness of the stack, the substrate is the layer that contributes most to the stiffness, i.e. provides more resistance to bending than any of the other layers of the stack. A substrate does not significantly deform under its own weight, although it may sag to a certain extent. The substrate may be, for example, up to a few mm thick, depending on the size of the display and the type of material used. In one exemplary embodiment, a 30" LCD-TV has a 2 mm thick PMMA bulk diffuser plate. In another exemplary embodiment, a 40" LCD-TV has a 3 mm thick PMMA bulk diffuser plate.

One or both sides of one or more of the layers in the light management unit, for example, the diffuser layer, the substrate, polarizer or brightness enhancing layer may be provided with a matte finish.

Exemplary embodiments of the diffuser layer include a polymer matrix containing diffusing particles. The polymer matrix may be any suitable type of polymer that is substantially transparent to visible light, for example any of the polymer materials listed above.

The diffusing particles may be any type of particle useful for diffusing light, for example transparent particles whose refractive index is different from the surrounding polymer matrix, diffusely reflective particles, or voids or bubbles in the matrix. Examples of suitable transparent particles include solid or hollow inorganic particles, for example glass beads or glass shells, solid or hollow polymeric particles, for example solid polymeric spheres or hollow polymeric spheres. Examples of suitable diffusely reflecting particles include particles of titanium dioxide ($TiO_2$), calcium carbonate ($CaCO_3$), barium sulphate ($BaSO_4$), magnesium sulphate ($MgSO_4$) and the like. In addition, voids in the polymer matrix may be used for diffusing the light. Such voids may be filled with a gas, for example air or carbon dioxide. Commercially available materials suitable for use in a diffuser layer include 3M™ Scotchcal™ Diffuser Film, type 3635-70 and 3635-30, and 3M™ Scotchcal™ ElectroCut™ Graphic Film, type 7725-314, available from 3M Company, St. Paul, Minn. Other commercially available diffusers include acrylic foam tapes, such as 3M™ VHB™ Acrylic Foam Tape No. 4920.

The diffuser layer 218 may itself be a diffuse adhesive layer, in which case the diffuser layer 218 may be attached directly to the substrate 216, for example, by lamination. Adhesive diffusive layers are discussed in greater detail in International (PCT) Patent Publications WO99/56158 and WO97/01610, incorporated herein by reference. Adhesive diffusive layers may be used in any of the embodiments of light management unit discussed herein. In some exemplary embodiments, the diffuser layer 204 has a diffusion characteristic that is uniform across its width, in other words the amount of diffusion experienced by light is the same for points across the width of the diffuser layer.

Figure 2C:
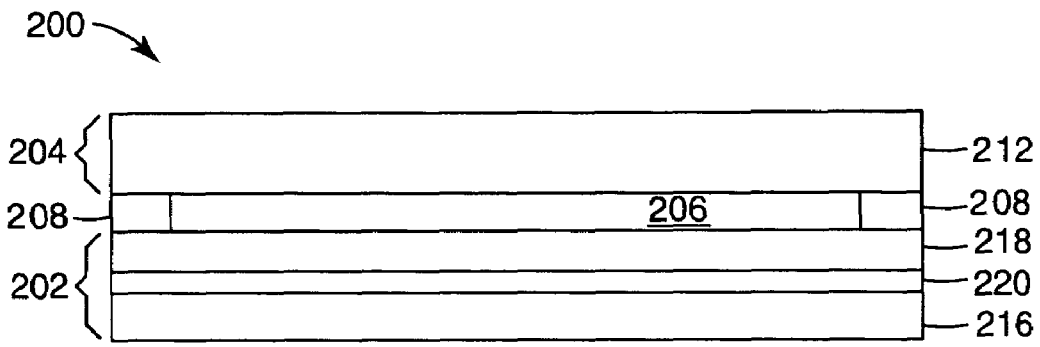

In other exemplary embodiments, the diffuser layer 218 may be attached to the surface of the substrate 216 using an adhesive layer 220, as is schematically illustrated in FIG. 2C. In some exemplary embodiments, the adhesive layer 220 may be an optically clear adhesive, a diffusive adhesive, or an acrylic foam tape either with or without optical diffusion.

In the exemplary embodiments illustrated in FIGS. 2B and 2C, the first subassembly 202 is shown with the diffuser layer 218 lying closer to the gap 206 than the substrate 216. This need not be the case, and the substrate 216 may lie closer to the gap 206 than the diffuser layer 218.

The diffuser layer 218 may optionally be supplemented with an additional patterned diffuser 218a. The patterned diffuser 218a may include, for example, a patterned diffusing surface or a printed layer of diffuser, such as particles of titanium dioxide ($TiO_2$). The patterned layer 218a may lie on the substrate 216, between the diffuser layer 218 and the substrate 216, or above the diffuser layer 218. The patterned diffuser 218a may be, for example, printed onto the diffuser layer 218, as illustrated in FIG. 2B, or onto a sheet that lies above the diffuser layer 218.

Figure 2D:
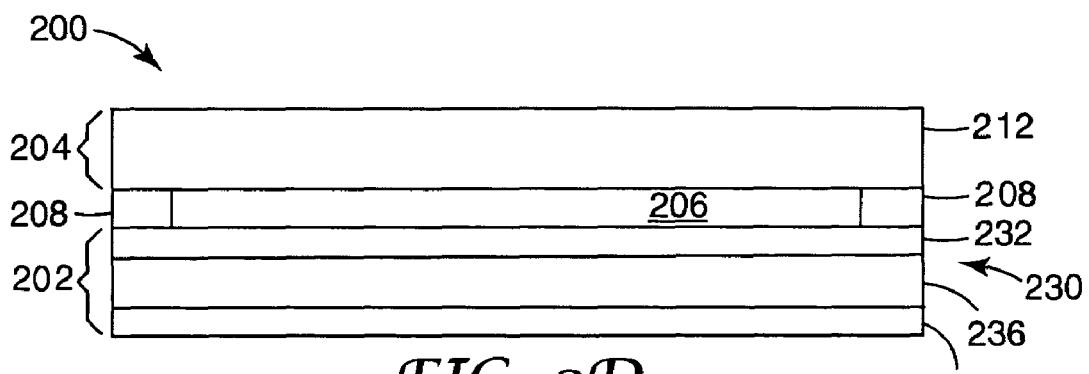

In another exemplary embodiment, schematically illustrated in FIG. 2D, the diffuser plate 230 may be double-sided, having a first diffuser layer 232 on one side of the substrate 236 and a second diffuser layer 234 on another side of the substrate 236. The first and second diffuser layers 232, 234 may each be applied directly to the respective surface of the substrate 236, as illustrated, or may be attached using respective adhesive layers.

The double-sided diffuser plate 230 may be symmetrical, with the two diffuser layers 232, 234, having the same diffusion properties, or may be asymmetric, with the diffuser layers 232, 234 having different diffusing properties. For example, the first diffuser layer 232 may possess a different transmission or haze level from the second diffuser layer 234, or may be of a different thickness.

Figure 2E:
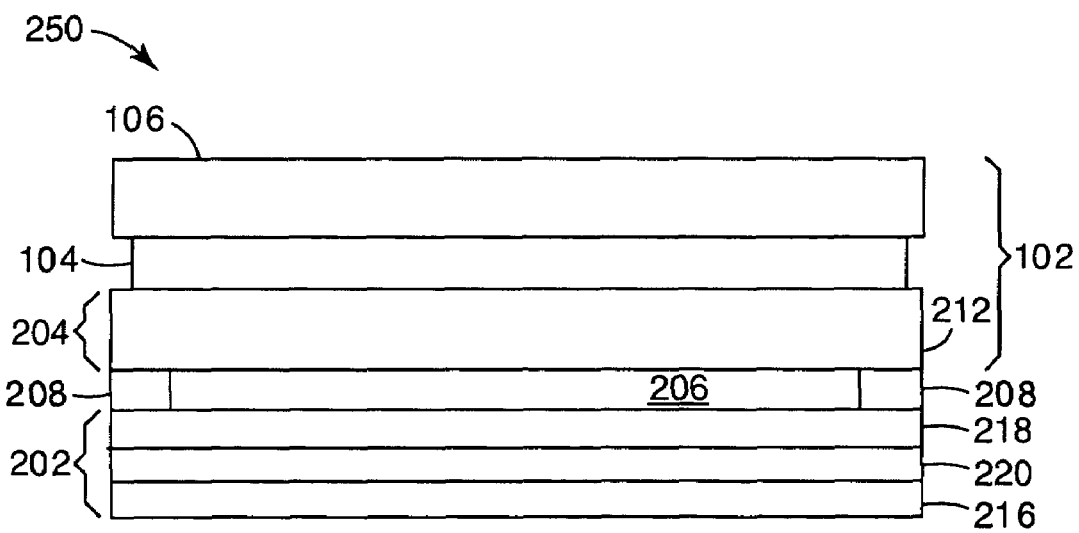

Another exemplary embodiment of light management unit 250 is schematically illustrated in FIG. 2E. In this embodiment, the substrate 212 of the second subassembly 204 also forms the lower panel plate of the LC display panel 102. Other light management layers, not illustrated, may be included in the second subassembly 204, for example between the substrate 212 and the gap 206. Some exemplary configurations of second subassembly 204, in which the uppermost layer of the second subassembly is a substrate that may also constitute the lower panel plate of an LCD panel, are described further below.

The first subassembly 202 is not restricted to including only a diffuser plate and may include other optical layers. Some exemplary embodiments of other layers being included in the first subassembly 202 are discussed below.

The second subassembly 204 may be formed from a single sheet of material or may include a number of different layers. The second subassembly 204 may be formed from a substrate alone. The second subassembly 204 may also include a diffuser and/or other layers, as will become apparent in the discussion below.

In some exemplary embodiments, the spacer 208 has a thickness selected to create the gap 206 between the first and second subassemblies 202, 204. The spacer 208 may be formed, for example, using an adhesive tape, a pressure sensitive adhesive (PSA) or other suitable forms of adhesive. For example, the spacer 208 may be formed using a hook and loop-type of attachment, with the hook and loop layers attached to either of the first and second subassemblies via a single-sided adhesive. Another approach includes using a sealant. Another approach includes structuring the edges of at least one of the first and second subassemblies with a raised portion to provide the gap. In another approach, a plate, such as an injection molded plate, could be used as the spacer. The spacer may optionally include tabs that extend laterally beyond the edges of the different layers of the first and second subassemblies: these tabs may be used for additional mounting supports in the backlight of the LCD device.

The light management unit may be provided with protection from ultraviolet (UV) light, for example by including UV absorbing material or material in one of the layers that is resistant to the effects of UV light. In particular, one or more of the layers may include a UV absorbing material, or may include a separate layer of UV absorbing material. Suitable UV absorbing compounds are available commercially, including, e.g., Cyasorb™ UV-1164, available from Cytec Technology Corporation of Wilmington, Del., and Tinuvin™ 1577, available from Ciba Specialty Chemicals of Tarrytown, N.Y. The diffuser plate may also include brightness enhancing phosphors that convert UV light into visible light.

One or more of the layers of the light management unit may also include other materials to provide additional protection to UV light. One example of such a material is a hindered amine light stabilizing composition (HALS). Generally, the most useful HALS are those derived from a tetramethyl piperidine, and those that can be considered polymeric tertiary amines. Suitable HALS compositions are available commercially, for example, under the "Tinuvin" tradename from Ciba Specialty Chemicals Corporation of Tarrytown, N.Y. One such useful HALS composition is Tinuvin 622. UV absorbing materials and HALS are further described in co-owned U.S. Pat. No. 6,613,619, incorporated herein by reference.

Figure 3A:
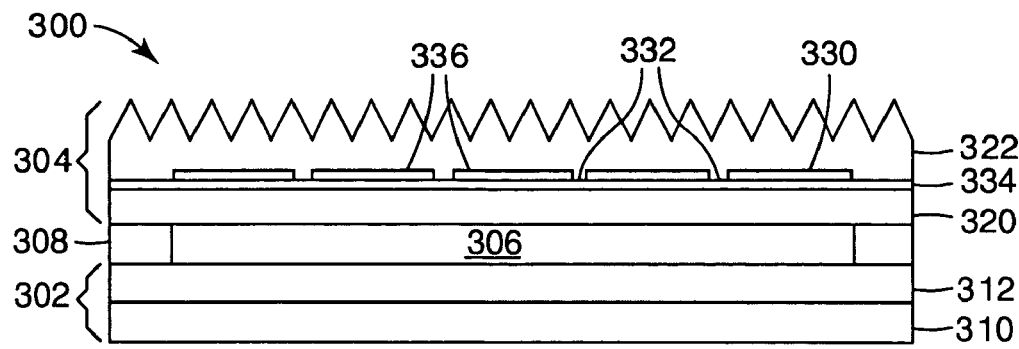
FIGS. 3A-3I schematically illustrate embodiments of light management units that incorporate a brightness enhancing layer according to principles of the present invention.

Other exemplary embodiments of light management units may incorporate additional light management layers. For example, a light management unit may include a brightness enhancing layer in either the first or second subassemblies or in the gap between the subassemblies. One exemplary embodiment of light management unit 300, schematically illustrated in FIG. 3A, includes a first subassembly 302 separated from a second subassembly 304 by a gap 306. A spacer 308 between the subassemblies 302, 304 may be used to define the gap 306. In the illustrated embodiment, the first subassembly 302 includes a diffuser plate formed with a substrate 310 and a diffuser layer 312. The first subassembly 302 may include different layers, for example, as shown in FIGS. 2A-2D, as well as other layers.

In the exemplary embodiments discussed here, the second subassembly 304 includes at least a semi-rigid substrate 320, although other layers may also be present. A brightness enhancing layer 322 is attached to the substrate 320. Examples of suitable brightness enhancing layers include the Vikuiti™ BEFII and BEFIII family of prismatic films available from 3M Company, St. Paul, Minn., such as BEFII 90/24, BEFII 90/50, BEFIIIM 90/50, BEFIII-T, T-BEF, R-BEF, W-BEF and PC-BEF (a prismatic coating on a non-birefringent polymer).

The brightness enhancing layer 322 may be attached directly to the adjacent layer in the second subassembly 304, or may be attached through the use of one or more adhesive layers.

In some exemplary embodiments, it may be desirable for at least some of the light to enter the brightness enhancing layer 322 through an air interface or an interface having an increased refractive index difference. Therefore, a layer of low index material, for example a fluorinated polymer, may be placed between the brightness enhancing layer 322 and the next layer below the brightness enhancing layer, in this case the substrate 320.

In other exemplary embodiments, an air gap may be provided between the brightness enhancing layer 322 and the layer below the brightness enhancing layer 322, so that diffused light enters the brightness enhancing layer 322 from air. One approach to providing the air gap is to include a structure on one or both of the opposing faces of the brightness enhancing layer 322 and the adjacent layer. In the illustrated embodiment, the lower surface 330 of the brightness enhancing layer 322 is structured with protrusions 332 that contact a layer of adhesive 334 on the substrate 320. Voids 336 are thus formed between the protrusions 332, with the result that light enters into the brightness enhancing layer 322 from air, at those regions between the protrusions 332.

Other approaches to forming voids, and thus providing an air interface to light entering the brightness enhancing layer, may be used. For example, the brightness enhancing layer 322 may have a flat lower surface 330, with the adhesive 334 being structured with protrusions. In another exemplary embodiment, either the unstructured surface of the brightness enhancing layer, or the surface to which it is attached, or both surfaces, may be roughened, for example with a matte finish, to provide pockets of air between the two surfaces. Additional approaches are discussed in co-owned U.S. Patent Publication No. 2003/0223216 A1, incorporated herein by reference. Any of the embodiments of light management unit discussed herein may be adapted to provide an air interface for light entering the brightness enhancing layer.

Figure 3B:
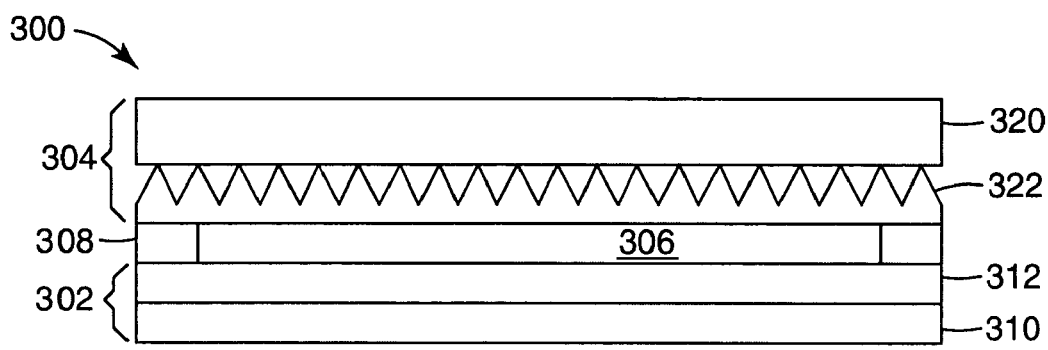

The brightness enhancing layer 322 may be located at different positions within the light management unit 300. For example, the brightness enhancing layer 322 may be positioned within the second sub-assembly 304 closer to the gap 306 than the substrate 320, as is schematically illustrated in FIG. 3B. In this embodiment, the brightness enhancing layer 322 contacts the spacer 308 and defines a boundary with the gap 306. In such a configuration, the apexes of the structure members of the brightness enhancing layer 322 may be adhered to the substrate 320 using a thin layer of adhesive. Approaches to attaching the surface of a brightness enhancing layer to another layer are discussed more fully in co-owned U.S. patent application Ser. No. 10/439,450, incorporated herein by reference.

Figure 3C:
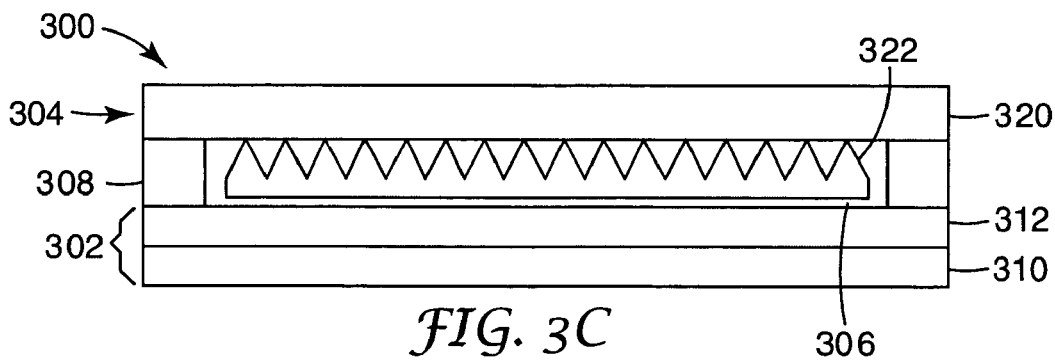

In another exemplary embodiment, schematically illustrated in FIG. 3C, the order of the layers is the same as in FIG. 3B, but the lateral extent of the brightness enhancing layer 322 may be reduced, so as to fit within the volume defined by the spacer 308. In such a configuration, the spacer 308 may contact a layer of the second subassembly 304 that is not the lowest layer of second subassembly 304. In the exemplary embodiment illustrated in FIG. 3C, the spacer 308 contacts the substrate 320, while the lowest layer of the second subassembly 304, the brightness enhancing layer 322, is located within the volume formed by the spacer 308. A gap 306, however small, may still exist between the first and second subassemblies 302, 304.

A gap is considered to exist even if the brightness enhancing layer 322 touches the first subassembly 302 because, structurally, the first subassembly 302 is connected to the second subassembly 304 via the spacer, and the two subassemblies 302, 304 are directly connected around their edges in a manner that provides mechanical rigidity to the light management unit 300. Also, either the lower surface of the brightness enhancing layer or the uppermost surface of the first subassembly 302, or both, may be provided with a matte or anti-wet-out finish, which results in much of the light passing from the first subassembly 302 into the brightness enhancing layer 322 through air. In such a case, the layers of the different subassemblies may contact each other at various points, with an air gap present between the points of contact. Such a gap may be as small as around one micron.

Figure 3D:
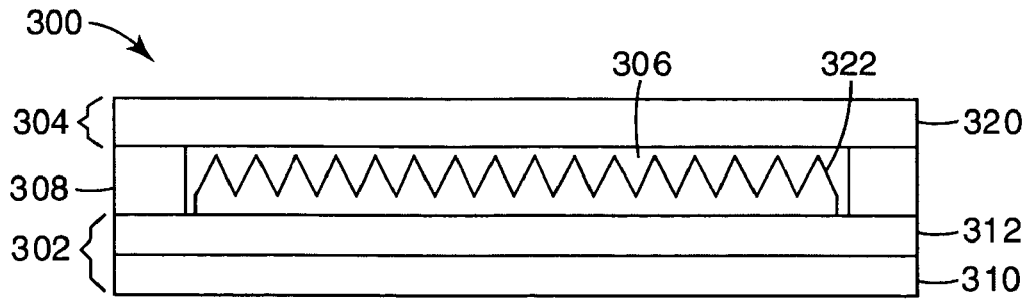

In other exemplary embodiments, the brightness enhancing layer 322 may be included with the first subassembly 302, rather than the second subassembly 304. For example, as is schematically illustrated in FIG. 3D, the brightness enhancing layer 322 may be the uppermost layer in the first subassembly 302, closest to the gap 306. In the illustrated embodiment, the lateral extent of the brightness enhancing layer 322 is set so as to fit within the space defined by the spacer 308. The brightness enhancing layer 322 may be attached directly to the next lower layer in the first subassembly, in this case the diffuser layer 312, or may be attached to the diffuser layer 312 via an adhesive layer (not shown).

In addition, the brightness enhancing layer 322 may be free-standing within the gap 306 without being attached to either subassembly 302, 304. The uppermost surface of the first subassembly 302 may be provided with a matte or an anti-wet-out finish, resulting in the light that propagates upwards from the first subassembly 302 passing into air before entering the brightness enhancing layer 322.

Figure 3E:
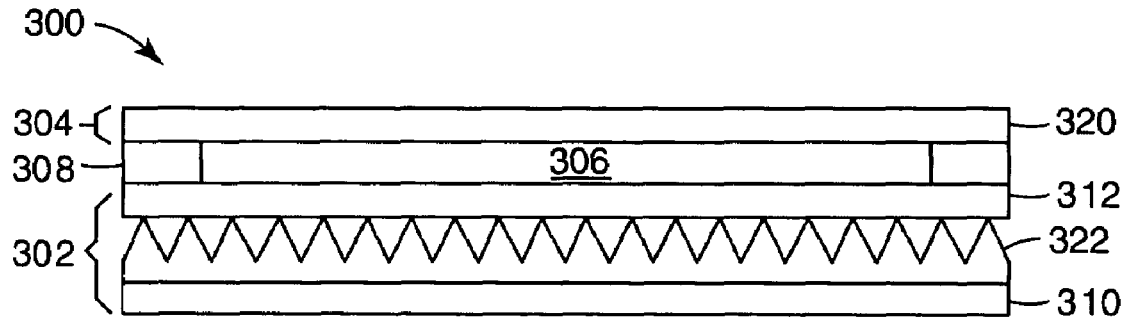

The brightness enhancing layer 322 may be positioned at other locations within the first subassembly 302. In one exemplary embodiment, the brightness enhancing layer 322 may be positioned between the uppermost and lowermost layers of the first subassembly 302, for example, between the diffuser layer 312 and substrate 310, as is schematically illustrated in FIG. 3E.

Figure 3F:
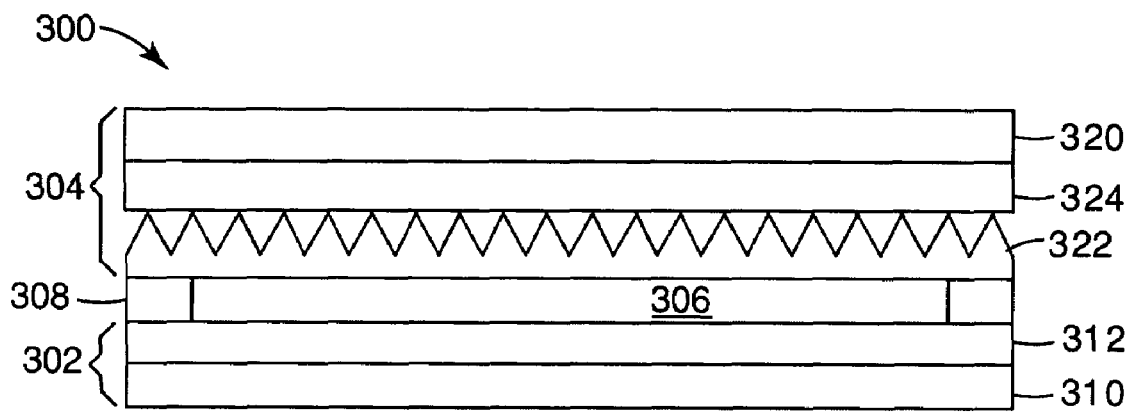

In other exemplary embodiments, there may be two prismatic brightness enhancing layers, with the prismatic structures of one of the layers oriented perpendicular to the prismatic structures of the other layer. Such an arrangement is referred to as crossed brightness enhancing layers, and provides control of the viewing angle in two dimensions. For example, one of the brightness enhancing layers affects the horizontal viewing angle for light emitted by an LCD-TV or LCD monitor, while the crossed brightness enhancing layer affects the vertical viewing angle of the light. An example of such an arrangement is schematically illustrated in FIG. 3F, in which the second subassembly 304 includes two brightness enhancing layers 322 and 324. The two brightness enhancing layers 322 and 324 may be located in the first subassembly 302 or in the second subassembly 304. The two brightness enhancing layers 322 and 324 may be located adjacent to each other, but need not be adjacent, and may even be located in the different subassemblies.

Other approaches to forming a subassembly having a layer of air between the lower surface of the brightness enhancing layer and the layer below are now discussed with reference to FIGS. 3G-3I.

Figure 3G:
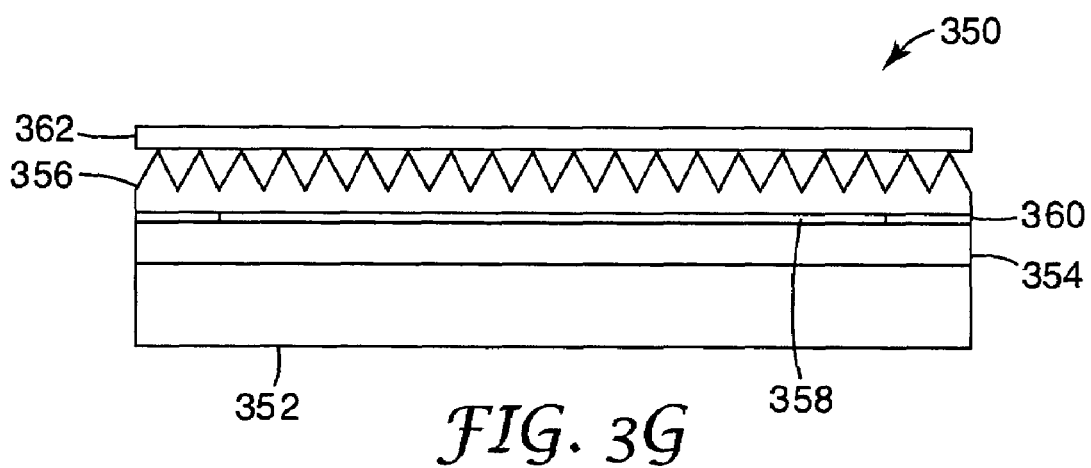

An exemplary embodiment of a subassembly 350 is schematically illustrated in FIG. 3G, having a substrate 352, another layer 354 on the substrate 352, for example a diffuser layer or a reflective polarizer, and a brightness enhancing layer 356. An air gap 358 is formed between the brightness enhancing layer 356 and the layer below 354. The air gap 358 may be formed by providing a layer of adhesive 360 between layer 354 and the brightness enhancing layer 356, around the edge of the subassembly 350. Another layer 362, for example a reflecting polarizer, may optionally be provided above the brightness enhancing layer 356, and may be attached to the brightness enhancing layer 356. In a variation of this embodiment, the brightness enhancing layer 356 may be replaced with a reflective polarizer that has a brightness enhancing structure on its upper side.

Figure 3H:
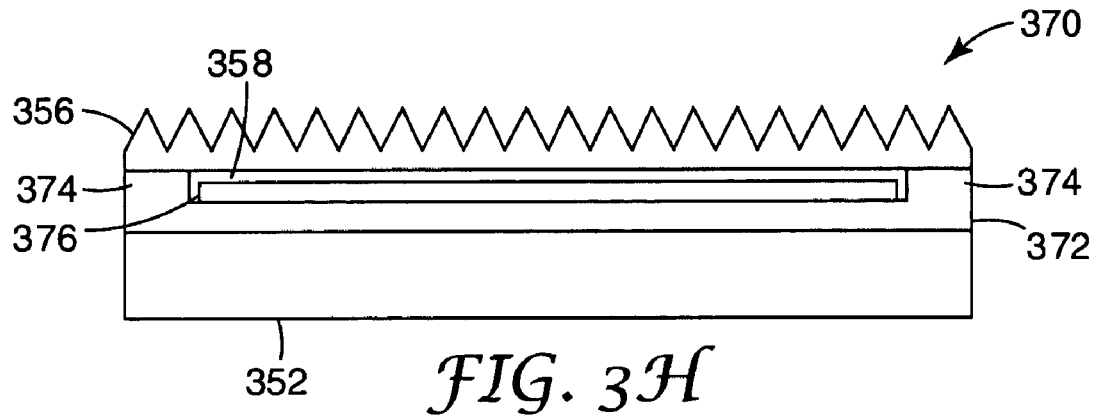

Another exemplary embodiment of a subassembly 370 is schematically illustrated in FIG. 3H. In this embodiment, an air gap 358 is formed between the brightness enhancing layer 356 and a lower layer 372 shaped with edge portions 374 that are higher than at the center of the layer 372. The layer 372 may be, for example, an adhesive layer, a diffuser layer or an adhesive diffuser layer. The brightness enhancing layer 356 is attached to the lower layer 372 at the edge portions 374. An intermediate layer 376 may be provided in the gap 358, for example a blank buffer layer or a reflecting polarizer. In this particular embodiment, the edge portions 374 of the layer 372 are higher than the intermediate layer 376.

Figure 3I:
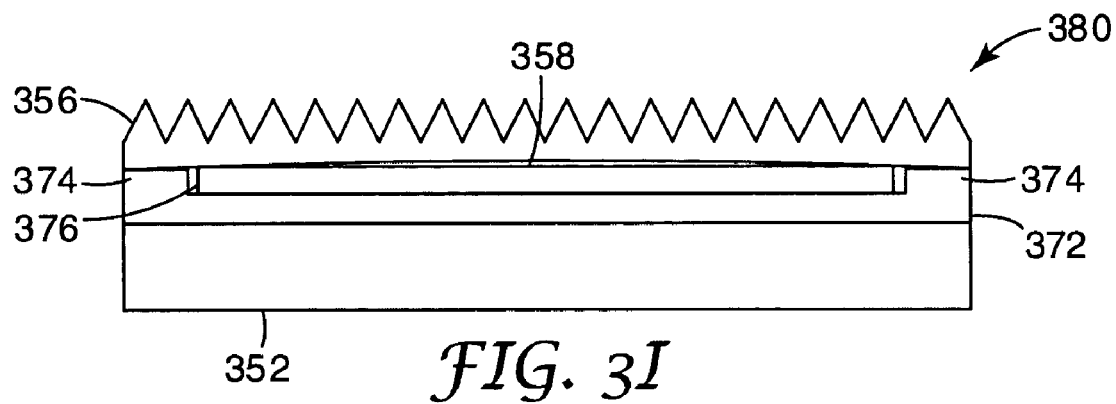

In another exemplary embodiment of subassembly 380, schematically illustrated in FIG. 3I, the edge portions 374 are not higher than the intermediate layer 376. Thus, when the brightness enhancing layer 356 is attached to the edge portions 374, the higher intermediate layer 376 bows the brightness enhancing layer 356 out, to produce an air gap 358 between the intermediate layer 376 and the brightness enhancing layer 356.

Figure 4A:
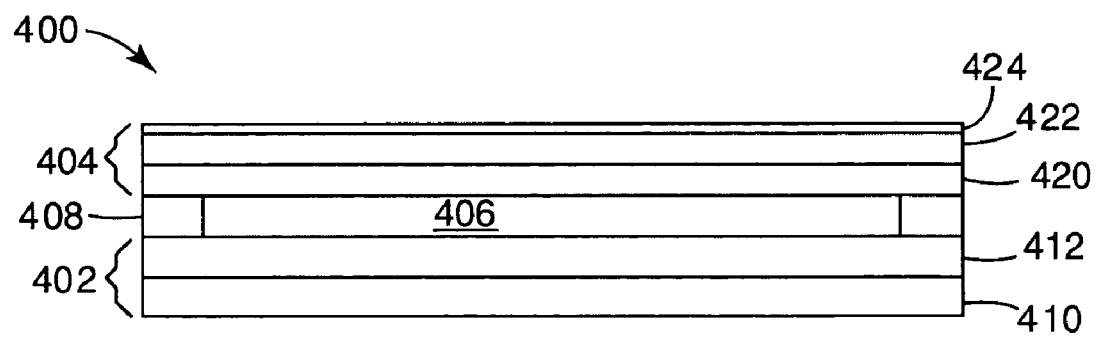
FIGS. 4A-4G schematically illustrate embodiments of light management units that incorporate a reflecting polarizer according to principles of the present invention.

In some other exemplary embodiments of light management units a reflective polarizer may be incorporated in the first or second light management units. One exemplary embodiment of light management unit 400, schematically illustrated in FIG. 4A, includes a first subassembly 402 separated from a second subassembly 404 by a gap 406. A spacer 408 between the subassemblies 402, 404 may be used to define the gap 406. In the illustrated embodiment, the first subassembly 402 includes a diffuser plate formed with a substrate 410 and a diffuser layer 412. The first subassembly 402 may include additional layers or different layers.

The second subassembly 404 may include a substrate 420 and may also include other layers. A reflecting polarizer 422 is attached to the substrate 420. Any suitable type of reflecting polarizer may be used, including a multilayer optical film (MOF) reflecting polarizer, a diffusely reflecting polarizer, a wire grid polarizer and a cholesteric polarizer. Cholesteric polarizers are often coupled with quarter wave retarding films to convert the circularly polarized light transmitted through the cholesteric polarizer to linearly polarized light, which is more suitable for use with other elements of the device, such as absorbing polarizers. Examples of a suitable MOF reflective polarizer include Vikuiti™ DBEF-D200 and DBEF-D440 multilayer reflective polarizers that include diffusive surfaces, available from 3M Company, St. Paul, Minn. An example of a suitable diffusely reflective polarizer includes Vikuiti™ Diffuse Reflective Polarizer Film (DRPF). Examples of suitable wire grid polarizers include the Proflux™ polarizer available from Moxtek Inc., Orem, Utah.

The reflective polarizer 422 may be attached directly to the adjacent layers in the subassembly, or may be attached through one or more intervening layers, for example an adhesive layer. For example, in the exemplary embodiment illustrated in FIG. 4A, the reflective polarizer 422 is attached directly to the substrate 420.

Optionally an additional coating 424 may be provided over the reflective polarizer 422. For example, the coating 424 may be a protective hard-coat layer. A hard coat may be provided over any outer surface of the first or second subassemblies.

Figure 4B:
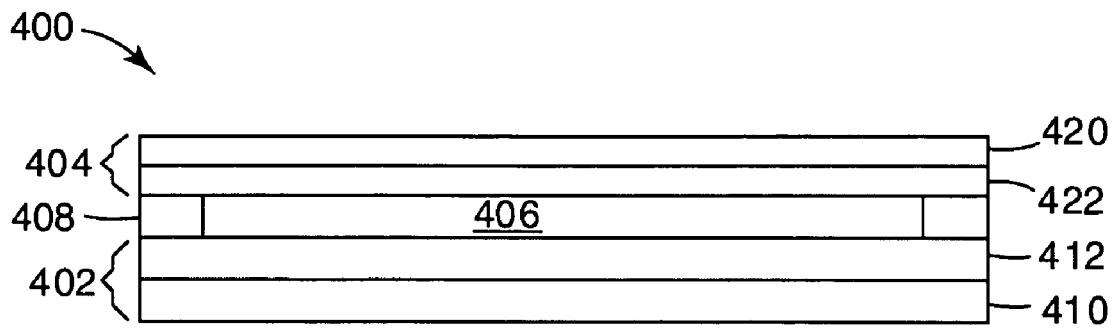

The reflective polarizer 422 may be located at different positions within the light management unit 400. For example, the reflective polarizer 422 may be positioned within the second sub-assembly 404 closer to the gap 406 than the substrate 420, as is schematically illustrated in FIG. 4B. In fact, the reflective polarizer 422 may be positioned as the uppermost layer of the second subassembly 404, furthest from the gap 406, the lowermost layer of the second subassembly, closest to the gap 406, or at any position in between. In the exemplary embodiment illustrated in FIG. 4B, the reflective polarizer 422 contacts the spacer 408 and defines a boundary with the gap 406.

Figure 4C:
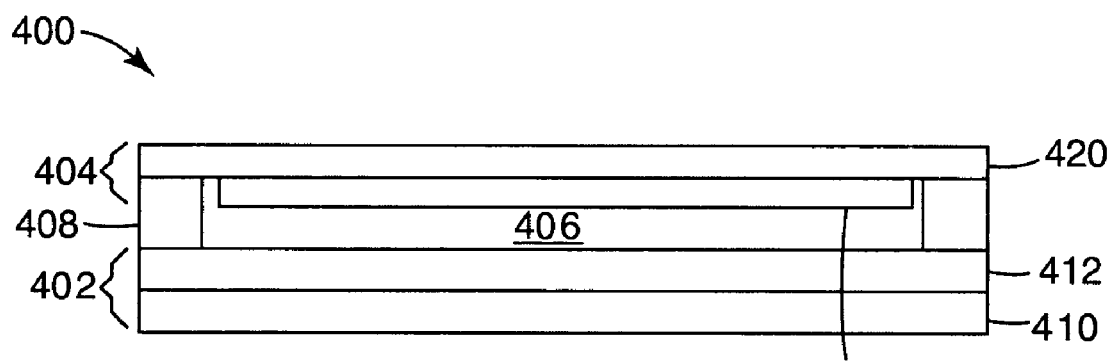

In another exemplary embodiment, schematically illustrated in FIG. 4C, the order of the layers is the same as in FIG. 4B, but the lateral extent of the reflective polarizer 422 is reduced, so as to fit within space defined by the spacer 408. In such a configuration, the spacer 408 may contact a layer of the second subassembly 404 that is not the lowest layer of second subassembly 404. In the exemplary embodiment illustrated in FIG. 4C, the spacer 408 contacts the substrate 420, while the lowest layer of the second subassembly 404, the reflective polarizer 422, is located between the elements of the spacer 408. A gap 406, however small, may still exist between the first and second subassemblies 402, 404.

Figure 4D:
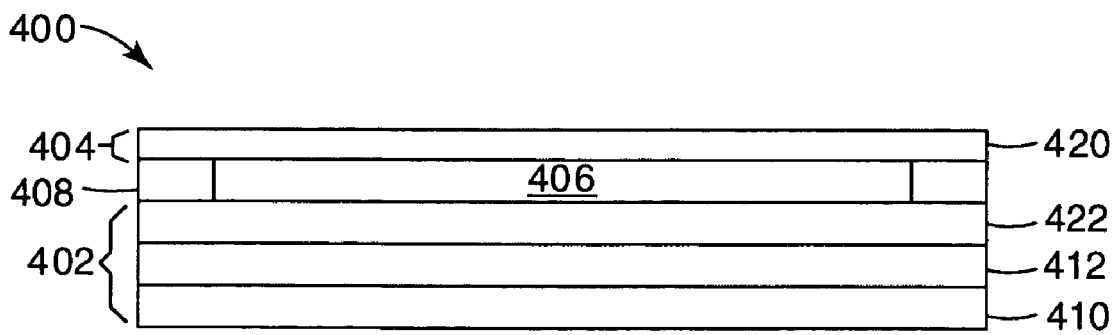

In other exemplary embodiments, the reflective polarizer 422 may be included with the first subassembly 402, rather than the second subassembly 404. For example, as is schematically illustrated in FIG. 4D, the reflective polarizer 422 may be the uppermost layer in the first subassembly 402, closest to the gap 406. The reflective polarizer 422 may be attached directly to the next lower layer in the first subassembly 402, in this case the diffuser layer 412, or may be attached via an adhesive layer (not shown).

It is generally preferred, although it is not a limitation, that optical layers placed between the reflective polarizer and the LCD panel, in this and other embodiments, be polarization preserving. This avoids or reduces adverse affects on the polarization of the light that has been polarized by the reflective polarizer.

Figure 4E:
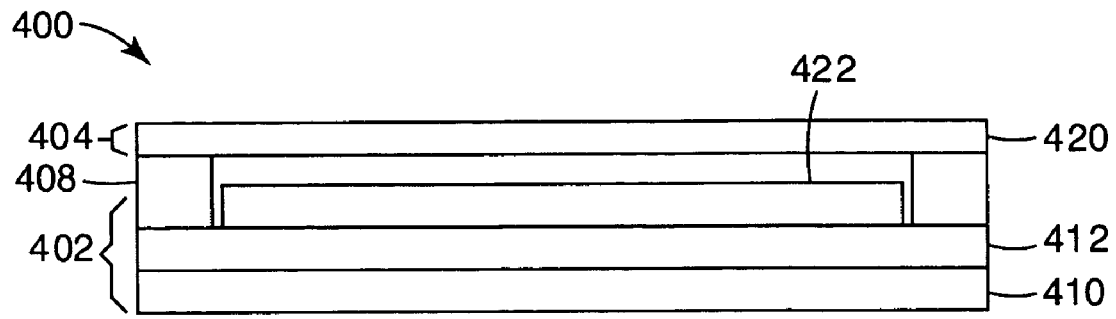

In another exemplary embodiment schematically illustrated in FIG. 4E, the order of the different layers within the first subassembly 402 is the same as in the embodiment shown in FIG. 4D. The lateral extent of the reflecting polarizer 422, however, is set so as to fit within the volume defined by the spacer 408.

Figure 4F:
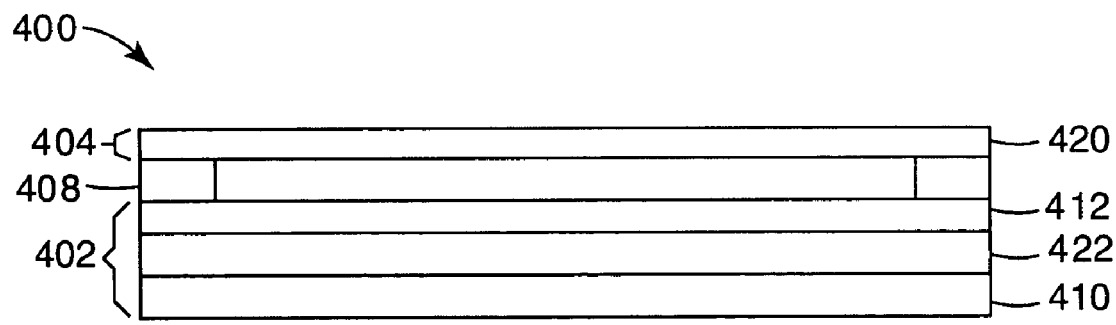
Figure 4G:
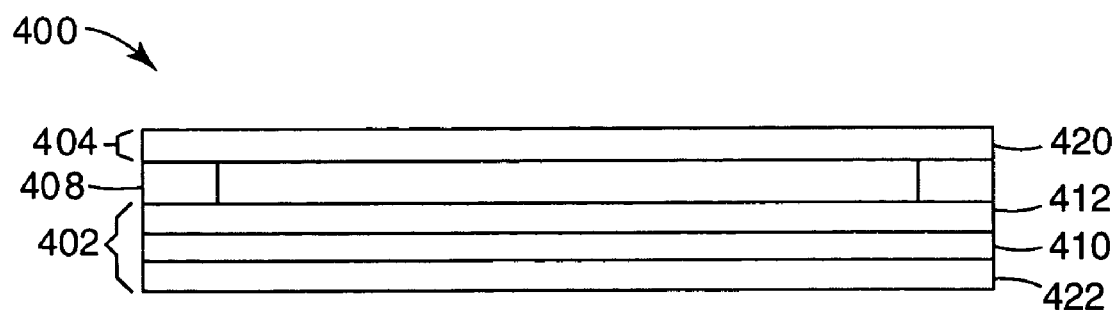

The reflecting polarizer 422 may be positioned at other locations within the first subassembly 402. In one exemplary embodiment, the reflecting polarizer 422 may be positioned between the uppermost and lowermost layers of the first subassembly 402, for example, between the diffuser layer 412 and substrate 410, as is schematically illustrated in FIG. 4F. In another exemplary embodiment, the reflecting polarizer 422 may be the lowermost layer in the first subassembly 402, furthest from the gap 406. For example, the reflecting polarizer 422 may be positioned below the diffuser layer 412 and the substrate 410, as is schematically illustrated in FIG. 4G.

Figure 5A:
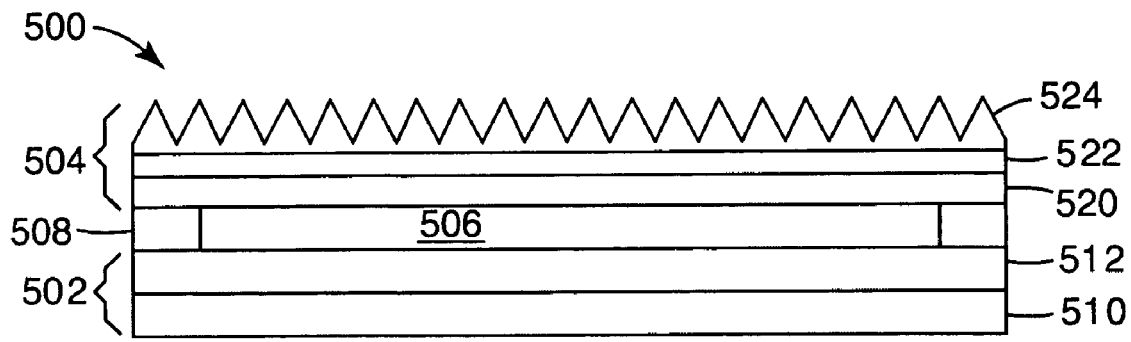
FIGS. 5A-5F schematically illustrate embodiments of light management units that incorporate a reflecting polarizer and a brightness enhancing layer according to principles of the present invention.

In other exemplary embodiments, the first and second subassemblies may contain different numbers and different types of optical layers from those described thus far. For example, the light management unit may include both a brightness enhancing layer and a reflective polarizer, along with a diffuser plate. One exemplary embodiment of such a light management unit 500 is schematically illustrated in FIG. 5A. The light management unit 500 includes a first subassembly 502 separated from a second subassembly 504 by a gap 506. A spacer 508 between the subassemblies 502, 504 may be used to define the gap 506. The first subassembly 502 may include a variety of different layers. In the illustrated embodiment, the first subassembly 502 includes a diffuser plate formed with a substrate 510 and a diffuser layer 512, while the second subassembly 504 includes a substrate 520, a reflective polarizer 522 and a brightness enhancing layer 524.

The reflective polarizer 522 and brightness enhancing layer 524 may be laminated together, or otherwise attached together, and may be positioned at different places within the light management unit 500. For example, a combination of the reflective polarizer 522 and the brightness enhancing layer 524 may be positioned below the substrate 520, so that the gap 506 forms a boundary with the lower surface of the reflective polarizer 522. The combination containing the reflective polarizer 522 and the brightness enhancing layer 524 may also be positioned in the first subassembly 502.

Figure 5B:
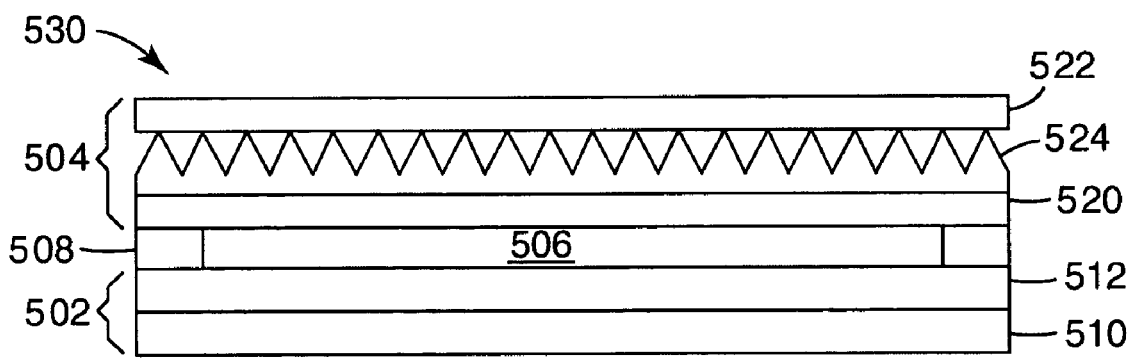

The order of the reflective polarizer 522 and brightness enhancing layer 524 may be different as is shown, for example, in the exemplary embodiment of light management unit 530 schematically illustrated in FIG. 5B. In this exemplary embodiment, the second subassembly 504 includes a brightness enhancing layer 524 between the substrate 520 and the reflective polarizer 522. In one approach to forming this configuration, the apexes of the structures of the brightness enhancing layer 524 may be attached to a layer of adhesive of the lower side of the reflective polarizer 522. This approach to attaching a brightness enhancing layer to another layer is discussed further in co-owned U.S. patent application Ser. No. 10/439,450.

A combination of the brightness enhancing layer 524 with its structured surface attached to the reflective polarizer 522, may be arranged at different positions within the light management unit 530. For example, the combination of the brightness enhancing layer 524 with its structured surface attached to the reflective polarizer 522 may be arranged between the substrate 520 and the gap 506, or may be positioned in the first subassembly 502. In a variation of this exemplary configuration, the lateral extent of one or both of the brightness enhancing layer 524 and the reflective polarizer 522 may be reduced so as to fit into the volume defined by the spacer 508, so that the substrate 520 contacts the spacer 508.

Figure 5C:
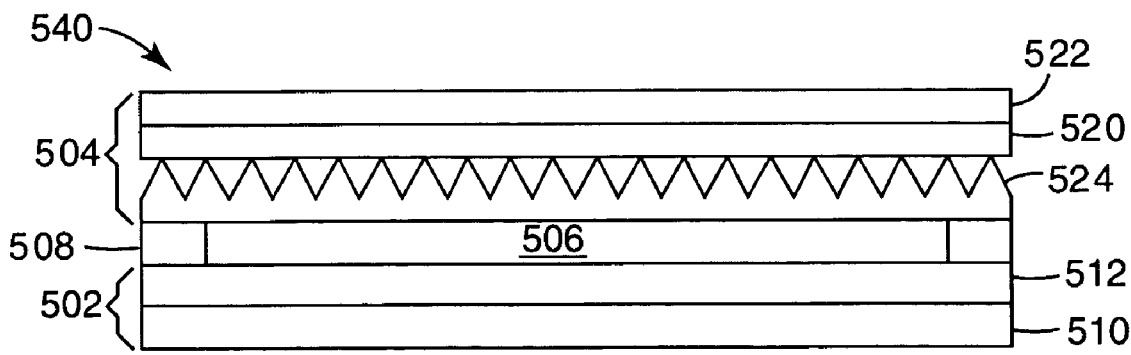

In other exemplary embodiments, the reflective polarizer 522 and brightness enhancing layer 524 need not be adjacent to each other, and need not even be in the same subassembly as each other. For example, in the exemplary embodiment of light management unit 540 schematically illustrated in FIG. 5C, the second subassembly 504 includes the substrate 520 positioned between the brightness enhancing layer 524 and the reflective polarizer 522. In a variation of this configuration, not shown, the lateral extent of the brightness enhancing layer 524 may be reduced so as to fit into the volume defined by the spacer 508, so that the substrate 520 contacts the spacer 508.

Figure 5D:
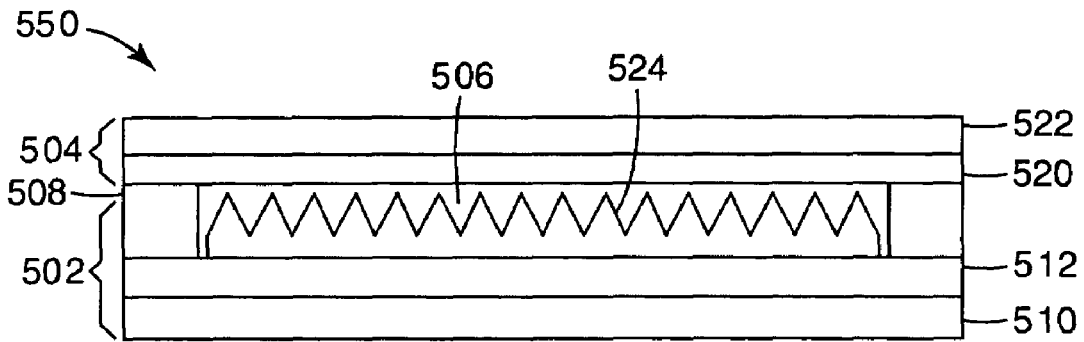

There is no requirement that both the reflective polarizer 522 and the brightness enhancing layer 524 be positioned within the second subassembly 504, and one or both may be positioned within the first subassembly 502, or within the gap 506. For example, in an exemplary embodiment schematically illustrated in FIG. 5D, the light management unit 550 has a first subassembly 502 that includes a diffuser layer 512 between a substrate 510 and the brightness enhancing layer 524. In the illustrated embodiment, the lateral extent of the brightness enhancing layer 524 is reduced so as to fit into the volume defined by the spacer 508, with the consequence that the diffuser layer contacts the spacer 508. This need not be the case, and the brightness enhancing layer 524 may extend across the same width as the diffuser layer 512.

Figure 5E:
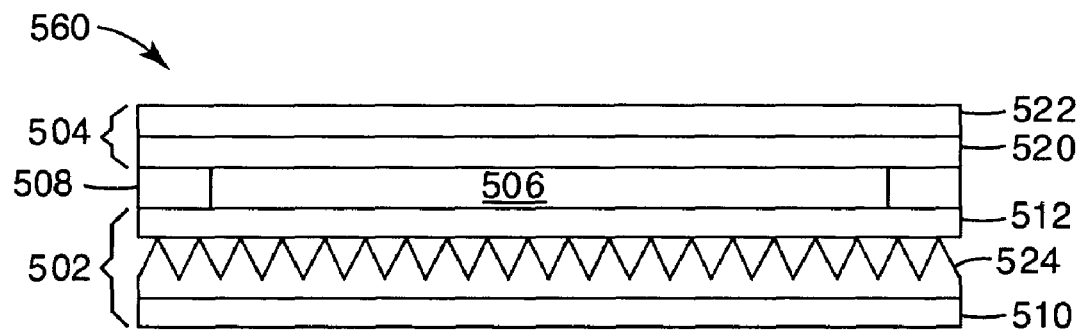

In another exemplary embodiment of light management unit 560, schematically illustrated in FIG. 5E, the first subassembly 502 includes a brightness enhancing layer 524 between a diffuser layer 512 and a substrate 510.

Figure 5F:
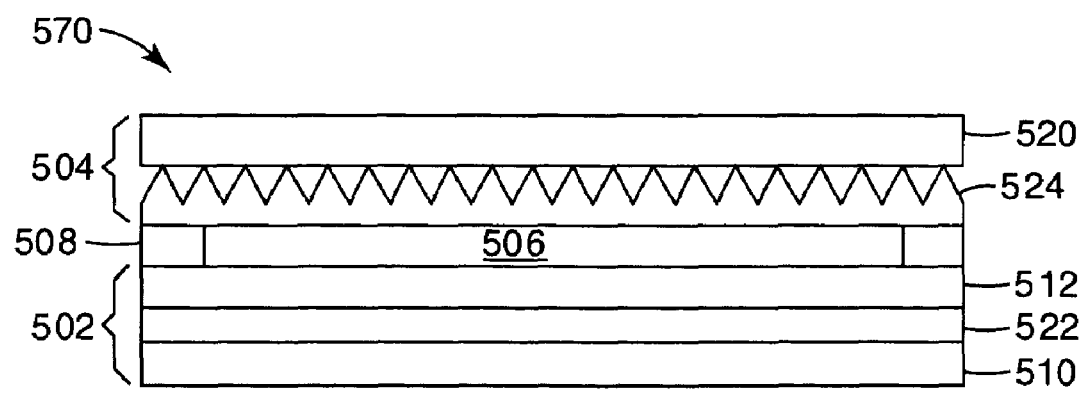

In other exemplary embodiments, the brightness enhancing layer 524 may be positioned in the second subassembly 504 while the reflective polarizer 522 is included in the first subassembly 502. For example, in the exemplary light management unit 570, schematically illustrated FIG. 5F, the first subassembly 502 includes a reflective polarizer 522 positioned between a diffuser layer 512 and a substrate 510, while the second subassembly includes a substrate 520 and brightness enhancing layer 524.

Some fluorescent light sources, referred to herein as a flat fluorescent lamp (FFL), provide a light emitting surface that extends in two dimensions. This surface is often flat or defines a plane, and may be used for attaching the diffuser layer and other optical layers. These types of light sources are also known by other names, such as flat discharge fluorescent lamp, and two-dimensionally integrated fluorescent lamp (TIFL). Some FFLs are based on a fluorescently converting the UV output from a mercury discharge, while other FFLs use the discharge of some other material. For example, the Planon II lamp, available from Osram GmbH, Munich, Germany, is a two dimensional fluorescent lamp based on a xenon excimer discharge. The light emitting surface is the surface of a substantially planar member that emits the light generated within the lamp. Some embodiments of the present invention use this light emitting member as a substrate for the first subassembly.

Figure 6A:
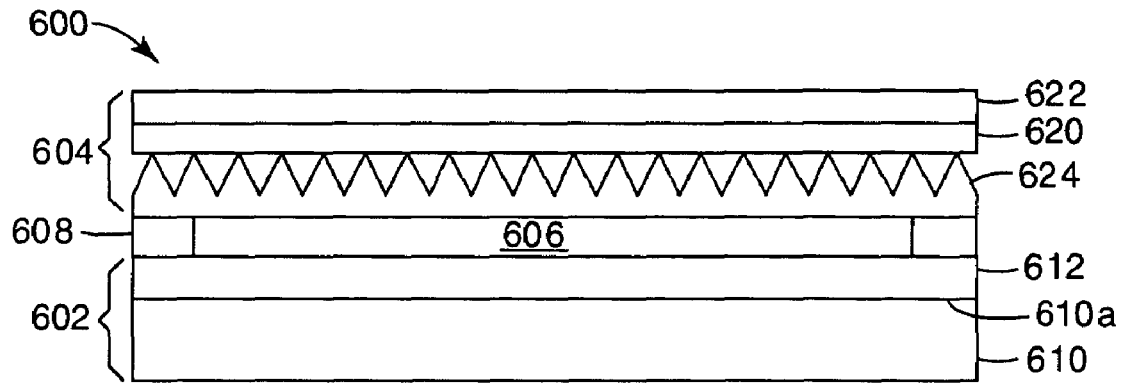
FIGS. 6A-6C schematically illustrate embodiments of light management units attached to a flat fluorescent light source, according to principles of the present invention.

One exemplary embodiment of a light management unit 600, comprising first and second subassemblies 602 and 604, is schematically illustrated in FIG. 6A. In this exemplary embodiment, the FFL 610 forms part of the first subassembly 602, with a diffuser layer 612 attached to light emitting member 610a of the FFL 610. In the illustrated embodiment, the second subassembly 604 includes a substrate 620, a reflective polarizer 622 and a brightness enhancing layer 624, and is attached to the first subassembly 602 via a spacer 608 so as to form a gap 606.

Figure 6B:
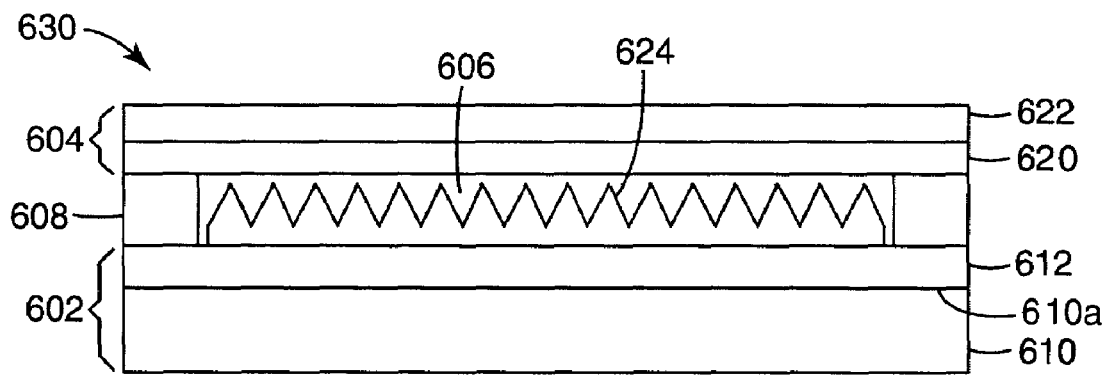

Other configurations of light management unit are possible where the substrate of the lower subassembly is provided by the FFL 610. For example, the reflective polarizer 622 and brightness enhancing layer 624 may be located at different positions within the second subassembly 604 and may either, or both, be included with the first subassembly 602. A different configuration of light management unit 630 is schematically illustrated in FIG. 6B, in which the brightness enhancing layer 624 is located within the gap 606 between the two subassemblies 602, 604. The brightness enhancing layer 624 may be attached to the first subassembly 602 or may be free standing within the gap 606.

Figure 6C:
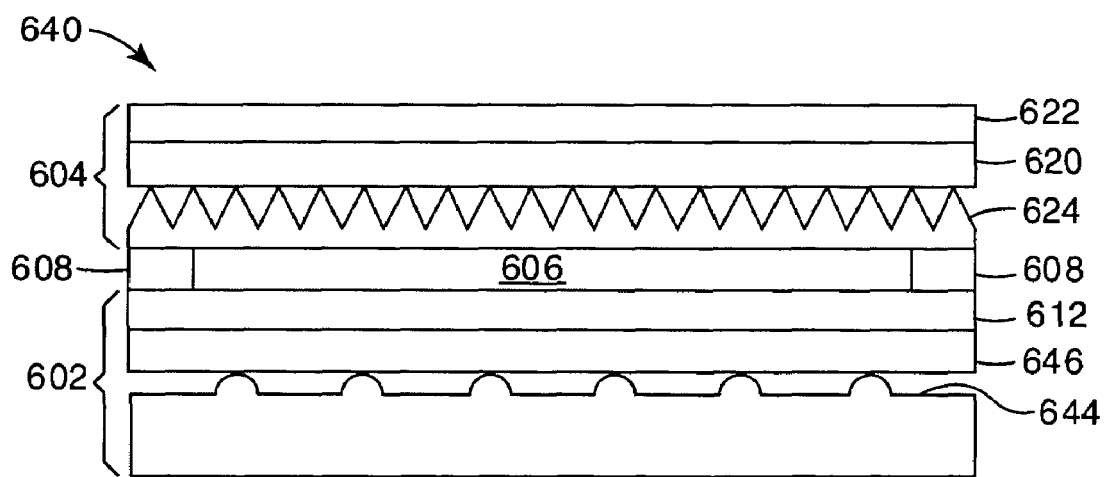

The FFL need not have a flat upper surface. For example, in the embodiment of light management unit 640 schematically illustrated in FIG. 6C, the FFL 642 has a ribbed upper surface 644. The diffuser layer 612 may be attached to the ribs of such a surface 644. For example, the diffuser layer 612 may be attached to the surface 644 via an adhesive layer 646, as illustrated. In other exemplary embodiments, the diffuser layer 612 may be attached directly to the surface 644, for example where the diffuser layer 612 is, itself, adhesive.

In some embodiments, the substrate 620 of the second subassembly may comprise the lower plate of the LCD panel (not shown).

The first and second subassemblies may include other layers not specifically illustrated in the figures. For example, a first subassembly may include two diffuser layers. In such a case, the two diffuser layers may be separated by a substrate, or may be separated by different layer, such as a brightness enhancing layer or reflective polarizer.

The scope of the invention is intended to cover embodiments in which the relative positions of different layers within a subassembly may be different from those illustrated in the figures. For example, in a first subassembly, the diffuser layer may be closer to the gap than the substrate, or the substrate may be closer to the gap. Also, other layers included in a first subassembly may be positioned closest to the gap, farthest from the gap, or at some location in between. Likewise, different layers in a second subassembly, such as substrate, diffuser layer, brightness enhancing layer or reflective polarizer, may, in different embodiments, each be located closest to the gap, farthest from the gap or at some location in between.

EXAMPLES

A number of sample light management units manufactured according to this disclosure were prepared and their performance was compared to the arrangement of films used for light management in commercially available LCD-TVs. The light management units were tested for single pass light transmission and reflection and for brightness and uniformity.

Figure 7A:
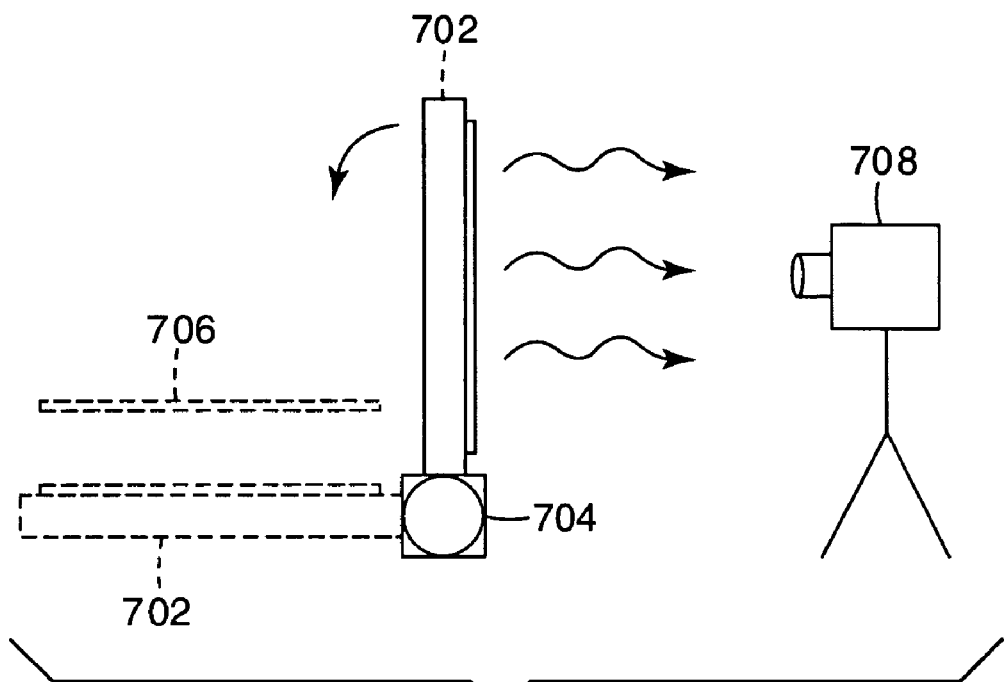
FIG. 7A schematically illustrates an experimental set up used for optically testing sample light management units.

The measurements of brightness and uniformity were performed on a specially designed LCD-TV experimental test bed. The test bed apparatus, illustrated schematically in FIG. 7A, used two functioning parts: namely i) a 22" Samsung LCD-TV, Model LTN226W, Model Code: LTN226WX/XAA and shown as element 702 in FIG. 7, and ii) a goniometer stage 704. The goniometer stage 704 allowed the TV 702 to be moved from a horizontal position (shown in dashed lines), used for film loading, to a vertical position (shown in solid lines) for the measurements. This arrangement provided for convenient for convenient loading and testing of various light management units 706. The LCD-TV 702 was located about ~15 feet (about 4.6 m) from a Radiant Imaging Prometric CCD Camera, Model 16111, shown as element 708, obtainable from DuVall, Wash. The camera was provided with a Radiant Imaging Optical Filter, 72 mm ND 2.0. The Prometric camera luminance was calibrated using a Photo Research PR 650 (Chatsworth, Calif., SSN: 60964502). For the measurements reported below, the LC panel and absorbing polarizers had been removed from the LCD-TV, and various light management units were used with the LCD-TV's backlight. The LCD-TV's backlight included an arrangement of eight parallel CCFL tubes. An absorbing polarizer, model LLC2-5518SF, available from Sanritz, Tokyo, Japan, was, in some cases, positioned over the light management unit to achieve simulation of an actual LCD-TV backlight.

The data was averaged across one direction, perpendicular to the long axis of the CCFL tubes, and reported as the luminance in nits, while the standard deviation, σ, in the brightness across the light management unit was collected on the same data to provide a metric for the uniformity.

A Conoscope™ optical measurement system, available from autronic-MELCHERS GmbH, Karlsruhe, Germany, was used to characterize the luminance as a function of angle for all the control samples and examples. An illumination box, referred to as a gain cube, was used as the light source for all the measurements. The gain cube comprises a highly reflective cavity, with light passing out of a Teflon® surface to illuminate the samples. Baseline measurements were performed by placing an absorbing polarizer, Sanritz, model LLC25518SF, on top of the gain cube and collecting a bright state measurement. This was used as the comparative to calculate the contrast ratio for all the samples. The sample light management units were placed on top of the gain cube and the absorbing polarizer was placed on top of the light management unit. Lab jacks were used to support both sides of the light management unit during the measurements. These measurements were used as the basis of calculating the axial gain and integrated gain. The axial gain and integrated gain are reported in units of nits/nits. In all cases, the Samsung (C-1) and Sharp (C-2) control samples were analyzed and the gains for these plates ranged from 1.78-1.84 using the various conoscopic characterization equipment. On several occasions conoscopic data was collected using an EZContrast conoscope, available from Eldim SA, Herouville Saint Clair, France. The data collection and manipulation was similar to that stated above for the autronic-MELCHERS apparatus.

Figure 8A:
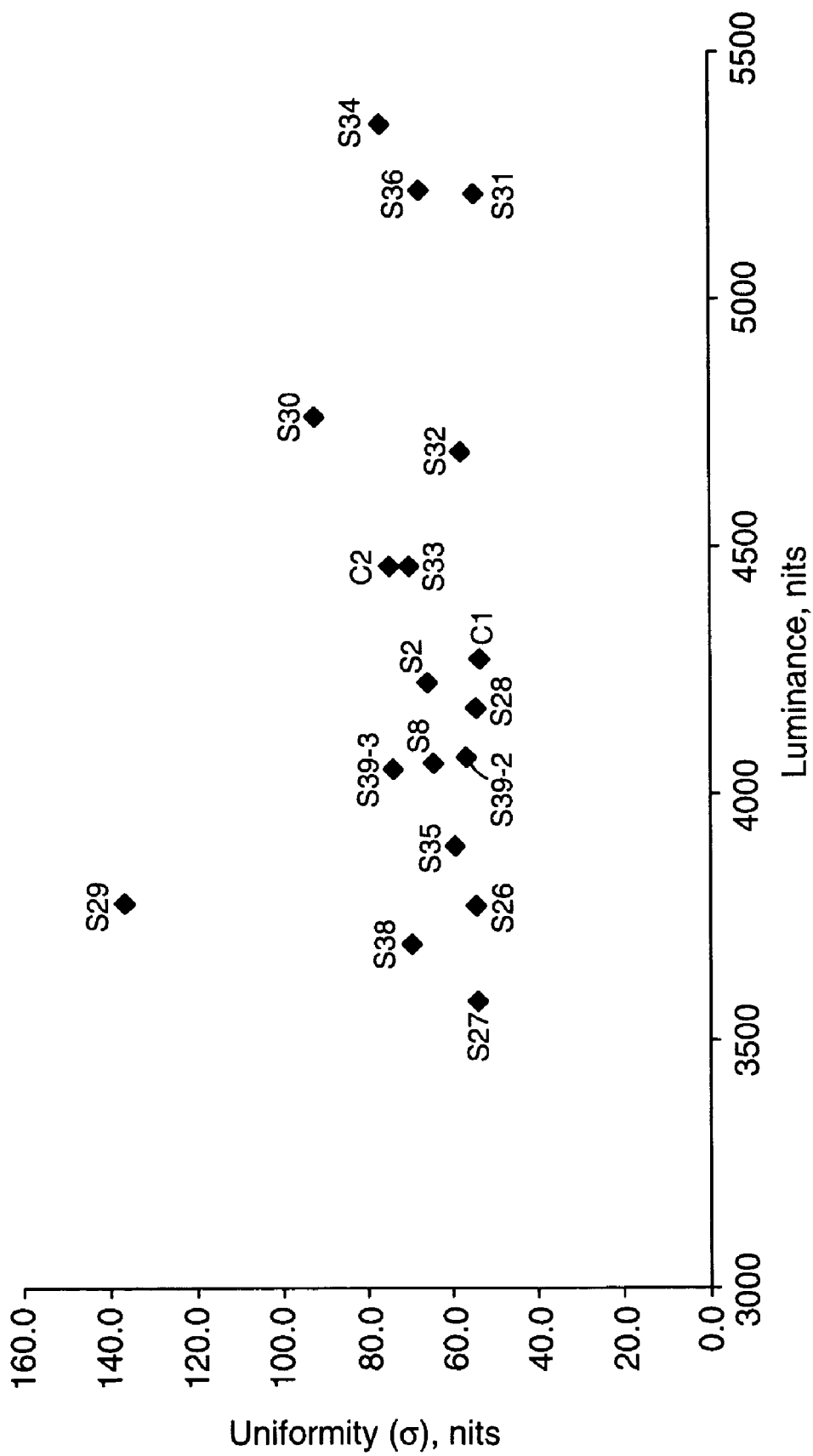
FIG. 8A presents a graph showing brightness uniformity plotted against overall brightness for control samples and example light management units fabricated in accordance with principles of the present invention.
Figure 8B:
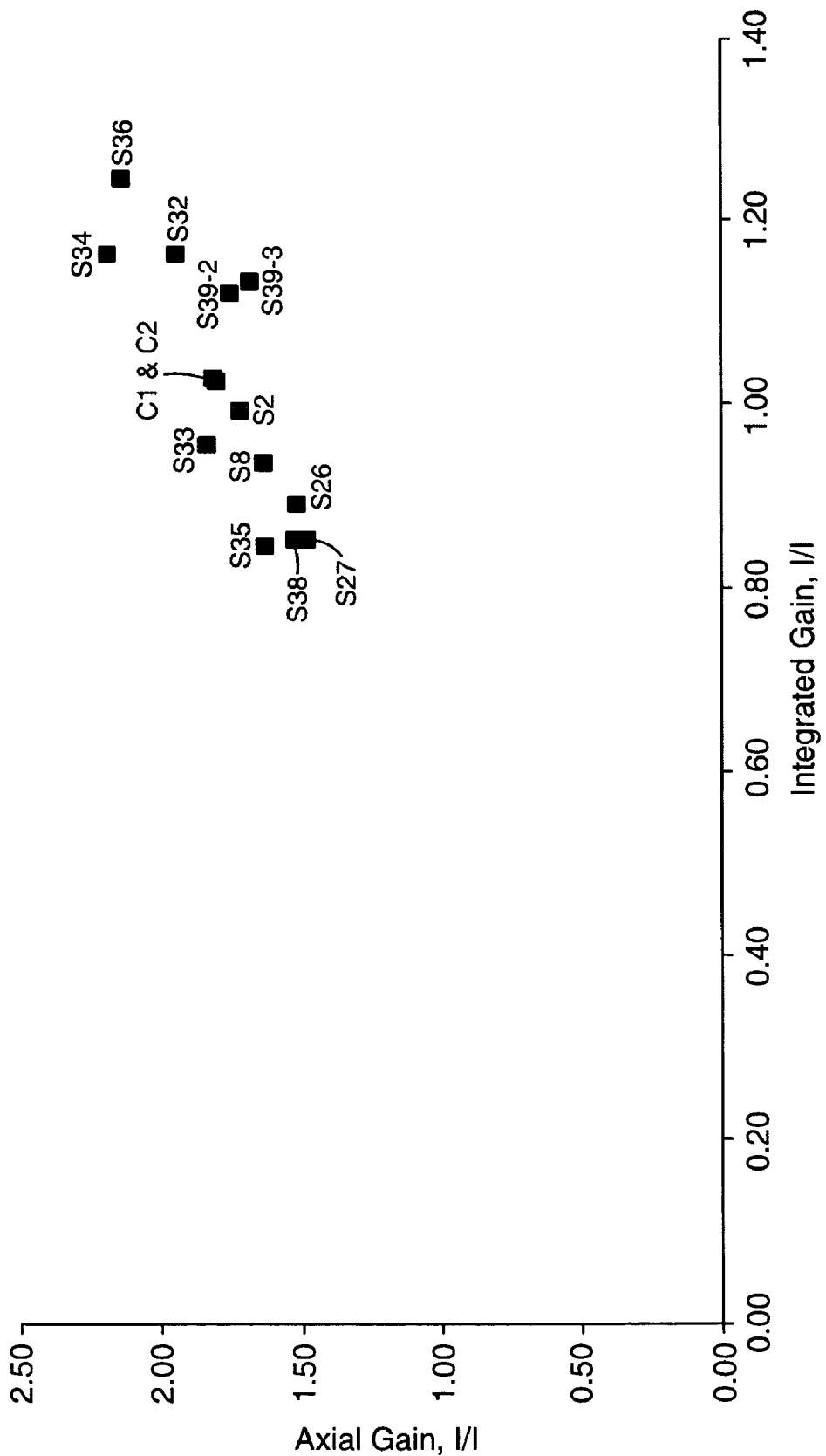
FIG. 8B presents a graph showing axial gain plotted against integrated gain control samples and sample light management units.

The structural and optical properties of each of the sample light management units and the control samples are summarized in Table I below, and values of brightness uniformity, σ, are shown plotted against total brightness in FIG. 8A. FIG. 8B shows the axial gain plotted against integrated gain for the different examples.

In Table I, each row presents the data for a single sample, the control samples, C-1 and C-2, being listed first. The "Subst" column lists the type of substrate used. In the case of a light management unit that has a substrate in each subassembly, the substrates were formed of the same material. The "Thick" column shows the thickness of the substrate, or substrates if the construction was of the dual substrate type. The "D1" column lists the type of diffuser layer attached to the side of the substrate facing away from the lamps. The "D2" column lists the type of diffuser layer used on the side of the substrate facing the lamps. In many examples, only a diffuser on the far side from the lamps was used. In the case of a light management unit composed of first and second subassemblies, the first subassembly contained the diffuser layer or layers. The "Top" column lists the different types of additional layers used in the light management unit, in the second subassembly.

The "Spacer" column lists the type of material used for the spacer separating the first and second subassemblies. The "Lum." column shows the total luminance measured for light transmitted through the light management unit, in nits. The "σ" column lists the standard deviation in the brightness measured across the light management unit, also in nits. The column labeled "σ/x" lists the ratio of the uniformity over the luminance, and indicates the relative uniformity of the brightness across the light management unit. The "Axial" and "Integ" columns respectively list the axial gain and the integrated gain. The axial gain is the brightness increase when measured at a normal angle to the illumination surface being characterized. The integrated gain is the change in surface illuminance as measured over an 80° acceptance angle, centered about a normal to the illumination surface. The axial gain was measured using the Eldim instrument for samples S26, S27, and S33-S39-3. The axial gain in the other samples was measured using the Autronic instrument.

Figure 7B:
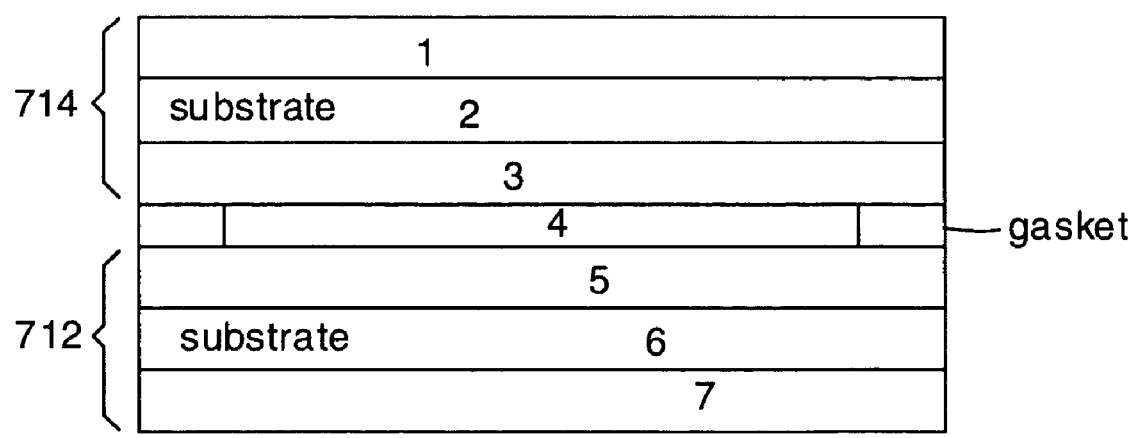
FIG. 7B schematically illustrates a construction of a composite light management unit according to embodiments of the present invention.

The relative positions of the different layers within the light management unit are summarized in Table II, and are described with reference to the light management unit schematically shown in FIG. 7B, which shows first and second subassemblies 712 and 714 separated by a spacer to form a gap. Positions 1-3 refer to positions within the second subassembly 714. The position of the substrate within the second subassembly is position 2. Position 1 refers to a position further from the gap than the substrate. Position 3 between the gap and the substrate. Positions 5-7 refer to positions within the first subassembly 712. Position 6 is the position of the substrate in the first subassembly 712. Position 5 is between the gap and the substrate of the first subassembly. Position 7 is on the side of the substrate further away from the gap. Position 4 is located within the gap.

TABLE I

Summary of Light Management Unit Examples and Control Examples

| No. | Subst. | Thick mm | D1 | D2 | Top | Spacer | Lum. nits | σ nits | σ/x % | Ax. G | Int. G |
|---|---|---|---|---|---|---|---|---|---|---|---|
| C1 | Samsung | 2 | n/a | n/a | n/a | n/a | 4268 | 53.3 | 1.2 | 1.78 | 1.04 |
| C2 | Sharp | 2 | n/a | n/a | n/a | n/a | 4456 | 74.4 | 1.7 | 1.90 | 1.10 |
| S2 | 1737F | 1 | 3635-70 | none | n/a | n/a | 4226 | 65.1 | 1.5 | 1.76 | 1.02 |
| S26 | Float | 1 | 3635-70 | none | n/a | n/a | 3769 | 54 | 1.4 | 1.53 | 0.90 |
| S8 | 1737F | 1 | 3635-70 | 3635-70 | n/a | n/a | 4060 | 64.1 | 1.6 | 1.70 | 0.99 |
| S27 | Float | 1 | 3635-70 | 3635-70 | n/a | n/a | 3578 | 53.8 | 1.5 | 1.48 | 0.86 |
| S28 | Float | 1 | 3635-70 | 3635-70 | BEF-RP (HH) | 10 mm 4220 | 4168 | 54.4 | 1.3 | 1.72 | 0.93 |
| S29 | Float | 1 | 3635-70 | 3635-70 | BEF-3T, DBEF-F | 20 mil. foam tape | 3776 | 135.8 | 3.6 | 1.78 | 1.09 |
| S30 | PMMA | 2 | 3635-70 | 3635-70 | BEF-RP 90/24 | 4220 | 4757 | 91.7 | 1.9 | 1.86 | 1.02 |
| S31 | PMMA | 2 | 3635-70 | none | BEF-RP 90/24 | 4220 | 5207 | 53.9 | 1.0 | 2.08 | 1.12 |
| S32 | Float | 1 | 3635-70 | none | BEF-3T, DBEF-F | 20 mil foam tape | 4686 | 57.4 | 1.2 | 2.20 | 1.4 |
| S33 | Float | 1 | 3635-70 | none | BEF-RP 90/24 | 5 mm 4220 | 4456 | 69.9 | 1.6 | 1.84 | 0.96 |
| S34 | PMMA | 0.8 | 3635-70 | none | BEF-RP 90/24 | 10 mm 4220 | 5346 | 76.1 | 1.4 | 2.19 | 1.17 |
| S35 | PC | 1 | 3635-70 | none | BEF-RP 90/24 | 10 mm 4220 | 3887 | 58.9 | 1.5 | 1.63 | 0.85 |
| S36 | PMMA | 2 | 3635-70 | none | BEF-3T, DBEF-F | 5 mm 4220 | 5216 | 67 | 1.3 | 2.14 | 1.25 |
| S38 | PC | 1 | 3635-70 | none | BEF-3T, DBEF-F | 5 mm 4220 | 3692 | 68.9 | 1.9 | 1.52 | 0.86 |
| S39-2 | Float | 1 | 3635-70 | none | BUD-2 | 5 mm 4220 | 4069.5 | 56.0 | 1.4 | 1.75 | 1.13 |
| S39-3 | Float | 1 | 3635-70 | none | BUD-3 | 5 mm 4220 | 4045 | 73.9 | 1.8 | 1.69 | 1.14 |

TABLE II

Summary of Positions of Different Layers in Sample Composite Light Management Units

| | S28 | S29 | S30 | S31 | S32 | S33 |
|---|---|---|---|---|---|---|
| Position 1 | BEF-RP(HH) | | BEF-RP (HH) | BEF-RP (HH) | | |
| Position 2 | 1 mm float | 1 mm float | 2 mm PMMA | 2 mm PMMA | | 1 mm float |
| Position 3 | | DBEF-F | | | | DBEF-F |
| Position 4 | | BEF-3T | | | | BEF-3T |
| Position 5 | 3635-70 | 3635-70 | 3635-70 | | | |
| Position 6 | 1 mm float | 1 mm float | 2 mm PMMA | 2 mm PMMA | 1 mm float | |
| Position 7 | 3635-70 | 3635-70 | 3635-70 | 3635-70 | 3635-70 | 3635-70 |
| Spacer | 4220 | 375 μm thick | 4220 | 4220 | 4220 | 4220 |

| | S34 | S35 | S36 | S38 | S39 |
|---|---|---|---|---|---|
| Position 1 | BEF-RP(HH) | BEF-RP-(HH) | | | |
| Position 2 | 1 mm PMMA | 1 mm PC | 2 mm PMMA | 1 mm PC | 1 mm float |
| Position 3 | | | DBEF-F | DBEF-F | BUD |
| Position 4 | | | BEF-3T | BEF-3T | |
| Position 5 | | | | | |
| Position 6 | 1 mm PMMA | 1 mm PC | 2 mm PMMA | 1 mm PC | 1 mm float |
| Position 7 | 3635-70 | 3635-70 | 3635-70 | 3635-70 | 3635-70 |
| Spacer | 4220 | 4220 | 4220 | 4220 | 4220 |

Control Sample C1

Control Sample 1 (1) is the Samsung light management unit that was included with 22" Samsung LCD-TV (Model: LTN226W). This light management unit included a diffuser plate formed of a 2 mm thick PMMA substrate that contained $CaCO_3$ diffusing particles. In addition, the plate possessed a printed pattern that was registered to the CCFL bulbs of the Samsung LCD-TV. The diffuser plate was accompanied by a prismatic brightness enhancing layer (3M Vikuiti™ BEF-3T) and a reflective polarizer (3M Vikuiti™ DBEFD-440). C1 is taken as representing a high performance LCD-TV light management unit.

Control Sample C2

Control Sample 2 (C2) is a light management unit formed using a diffuser plate taken from a 30" Sharp LCD-TV, model no. LC-30HV2U, and the prismatic brightness enhancing layer and reflective polarizer from C1. The diffuser plate was formed from a 2 mm thick plate of PMMA containing 5 μm glass spheres as the diffusing particles. This diffuser plate did not possess a printed pattern. C2 is taken as representing a standard LCD-TV light management unit.

Samples S2 and S26—Single Substrate, Single Diffuser

Example light management units S2 and S26 include single substrate diffuser plates, described as samples S2 and S26 in co-owned, co-pending U.S. patent application Ser. No. 10/966,610, titled "DIRECT-LIT LIQUID CRYSTAL DISPLAYS WITH LAMINATED DIFFUSER PLATES", filed on even date herewith, and incorporated herein by reference. The S2 diffuser plate used a 1 mm thick LCD glass substrate (Corning 1737F) and a Scotchcal™ 3635-70 diffuser film available from 3M Company, St. Paul, Minn., while the S26 diffuser plate used a 1 mm thick float glass substrate (Industrial Glass, Los Angeles, Calif.) with the Scotchcal™ 3635-70 diffuser film. The diffuser films provided a diffusion characteristic that was uniform across the width of the samples. These diffuser plates were used with the light management films (Vikuiti™ BEF-3T, Vikuiti™ DBEFD-440, PET layer and diffuser sheet) that accompanied the 22" Samsung LCD-TV. Table I displays the optical performance of examples S2 and S26. The brightness/uniformity for S2 and S26 was 4226/

65 nits and 3769/54 nits, respectively. The axial/integrated gain for S2 and S26 was 1.76/1.02 and 1.53/0.90, respectively.

Figure 9:
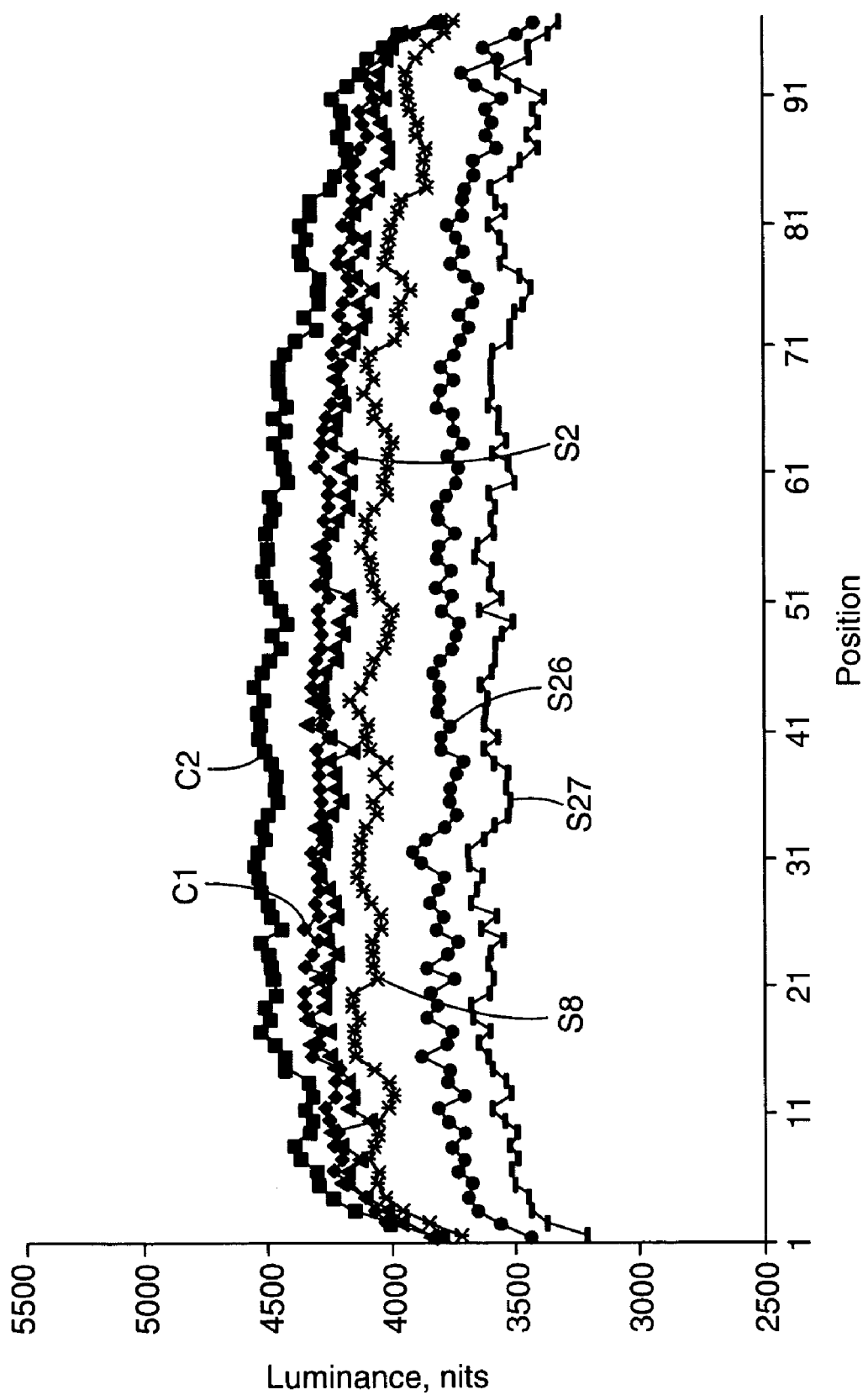
FIG. 9 presents a graph showing luminance as a function of position across a screen for two control samples and sample light management units S2, S8, S26 and S27.

FIGS. 7-9 show the optical performance of S2 and S26 compared to the other samples. FIG. 9 shows the luminance across the screen measured as a function of position. In general, S2 compares favorably to both C1 and C2. Also, a comparison of the optical performance of S2 and S26 shows that, in general, LCD Glass possesses better optical properties than Float Glass. Example S2 was used as a benchmark for the example composite light management units discussed below.

Samples S8 and S27—Single Substrate, Double Diffuser

Samples S8 and S27 were the same as S2 and S26 respectively, except that in each case the diffuser plate had layers of type 3635-70 diffuser film disposed on either side of the glass substrate. The diffuser films provided a diffusion characteristic that was uniform across the width of the samples. The brightness/uniformity for S8 and S27 were 4060/64 nits and 3578/54 nits, respectively. The axial/integrated gain for S8 and S27 was 1.70/0.99 and 1.48/0.86, respectively. FIGS. 7-9 show the optical performance of S8 and S27 compared to the other examples. S8 and S27 further demonstrate that LCD Glass possesses better optical properties than Float Glass. S8 was used as another benchmark for the composite light management units discussed below. This demonstrates that the inclusion of additional diffuser does not necessarily result in better illuminance uniformity, but does sacrifice brightness.

Samples 28, 29 and 30—Composite LMUs with Dual-Sided Diffuser

S28, S29 and S30 were composite light management units (LMUs) formed with a dual diffuser in the first subassembly. In each case, the first subassembly was made using a 1 mm thick piece of float glass substrate (Industrial Glass, Los Angeles, Calif.), with type 3635-70 diffuser film attached to each side of the substrate. The diffuser films provided a diffusion characteristic that was uniform across the width of the samples.

In example S28, the second subassembly was prepared by laminating 3M™ Vikuiti™ Brightness Enhancement Film-Reflective Polarizer (BEF-RP) 90/24 film to a 1 mm thick piece of float glass, the same as in the first subassembly, using an optically transparent acrylic copolymer pressure sensitive adhesive (PSA). The BEF-RP film comprises a reflective polarizer film with a prismatic brightness enhancing structure integrally provided on one side. The first and second subassemblies were then bonded, with the BEF-RP outside, at the edges with 1 cm wide 3M™ Acrylic Foam Tape (AFT) 4220, available from 3M Company, St. Paul, Minn. The light management unit was then annealed in an oven for 6 hours at 50° C.

Figure 10A:
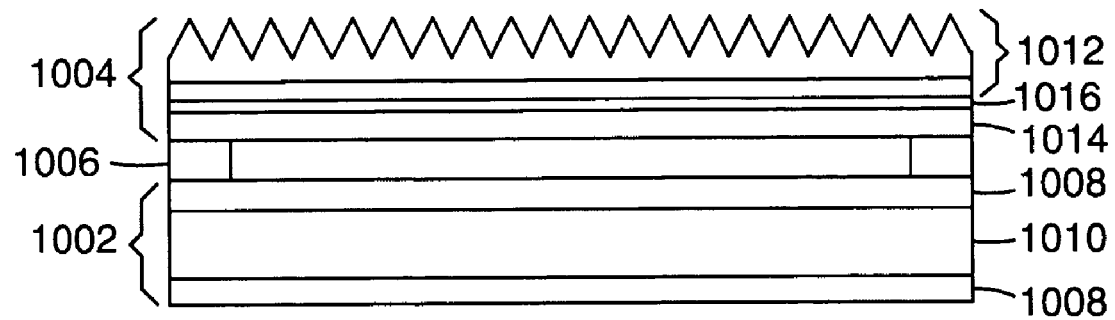
FIGS. 10A and 10B schematically show the structure of samples S28 and S29 respectively.

The construction of S28 is schematically illustrated in FIG. 10A. The sample was formed with the first subassembly 1002 and the second subassembly 1004 separated by the acrylic foam tape spacer 1006. The first subassembly 1002 included layers 1008 of 3635-70 diffuser attached to either side of the float glass substrate 1010. The second subassembly 1004 included the layer of BEF-RP 1012 attached to the float glass substrate 1014 via the adhesive layer 1016.

In example S29, the second subassembly was prepared by laminating 3M™ Vikuiti™ Dual Brightness Enhancement Film (DBEF-F), available from 3M Company, St. Paul, Minn., to a 1 mm thick piece of float glass using an optically transparent acrylic copolymer PSA. A sheet of 3M™ Vikuiti™ Brightness Enhancement Film III-transparent (BEF-3T), available from 3M Company, St. Paul, Minn., was cut to size and placed in the gap between the first and second subassemblies. The BEF-3T film was not laminated to either of the subassemblies. The subassemblies were then bonded at the edges with 375 µm thick foam tape. Example S29 was then annealed in an oven for 6 hours at 50° C.

Figure 10B:
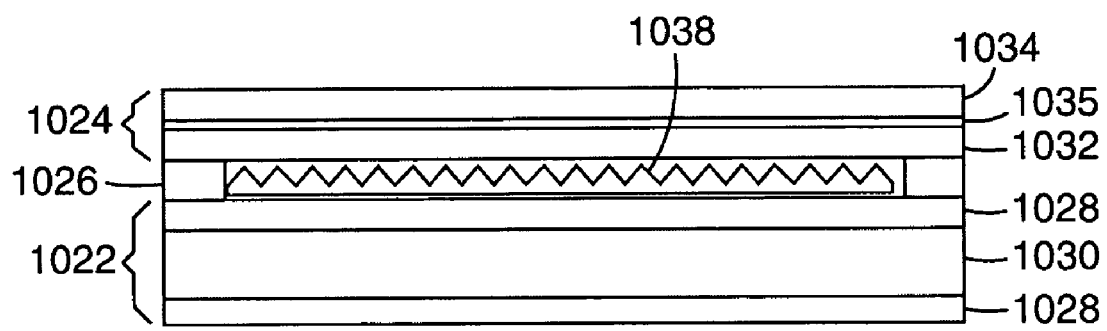

The construction of S29 is schematically illustrated in FIG. 10B. The sample was formed with the first subassembly 1022 and the second subassembly 1024 separated by the acrylic foam tape spacer 1026. The first subassembly 1022 included layers 1028 of 3635-70 diffuser attached to either side of the float glass substrate 1030. The second subassembly 1024 included the layer of DBEF-F 1032 attached to the float glass substrate 1034 via the adhesive layer 1036. The layer of BEF-3T 1038 disposed between the two subassemblies 1022, 1024.

Example S30 was made in the same manner as S28 except that 2 mm thick PMMA sheets (McMaster-Carr Inc., Chicago, Ill., part no. 8589K22) was used for the substrates in the first and second subassemblies.

Figure 11:
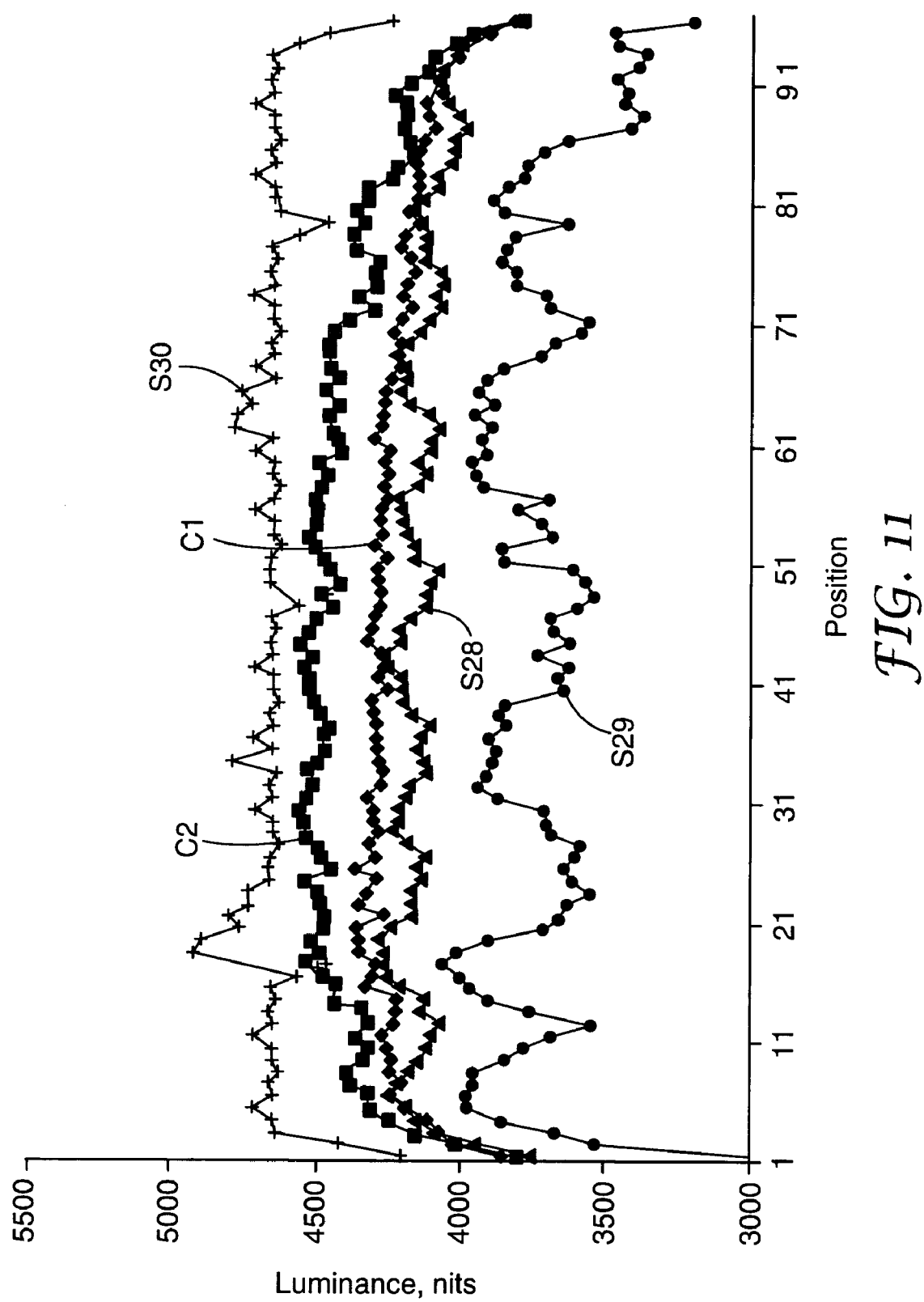
FIG. 11 presents a graph showing luminance as a function of position across a screen for two control samples and sample light management units S28, S29 and S30.

The brightness/uniformity for S28, S29 and S30 were 4168/54, 3776/136, and 4757/92 nits, respectively. The axial/integrated gain for S28, S29, and S30 were 1.72/0.93, 1.78/1.09, and 1.86/1.02, respectively. Examples S28 and S30 possess optical performance that meets or exceeds C1 and C2. Optical performance characterization is displayed in Table I and FIGS. 7, 8 and 11. FIG. 11 shows the luminance values across the samples as a function of position, for these three samples, as well as C1 and C2.

Samples S31, S33, S34 and S35—Composite LMUs with Single-Sided Diffuser

Example S31 was assembled using the same methods as described in for S30, except the first subassembly contained only a single layer of the diffuser, and the two subassemblies were each annealed at 50° C. for 4 hours prior to attachment with the AFT. The final assembled LMU was not annealed.

Example S33 was prepared using the same technique as described above for S31, except the substrates in the first and second subassemblies were 1 mm float glass (Industrial Glass, Los Angeles, Calif.).

Example S34 was prepared using the same technique as described in S31 except that the substrates in the first and second subassemblies were 0.8 mm thick PMMA (Plastics International, Eden Prairie, Minn., part no. ACRC-.31-S), rather than 2 mm thick PMMA.

Example S35 was prepared using the same technique as described in Example 31 except that the substrates were 1 mm thick sheets of PC (Plastics International, Eden Prairie, Minn., part no. LEX#-.4-S).

Figure 12:
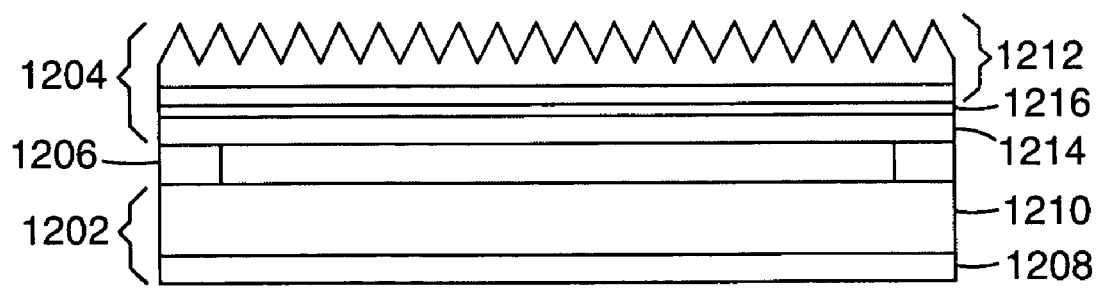
FIG. 12 schematically shows the structure of samples S31, S33, S34 and S35.

A schematic diagram showing the construction of examples S31, S33, S34, and S35 is shown in FIG. 12. The samples were formed using the first subassembly 1202 and the second subassembly 1204, separated by the acrylic foam tape spacer 1206. The first subassembly 1202 included the 3635-70 diffuser layer 1208 attached to the substrate 1210. The second subassembly 1204 included the layer of BEF-RP 1212 attached to the substrate 1214 via the adhesive layer 1216.

Figure 13:
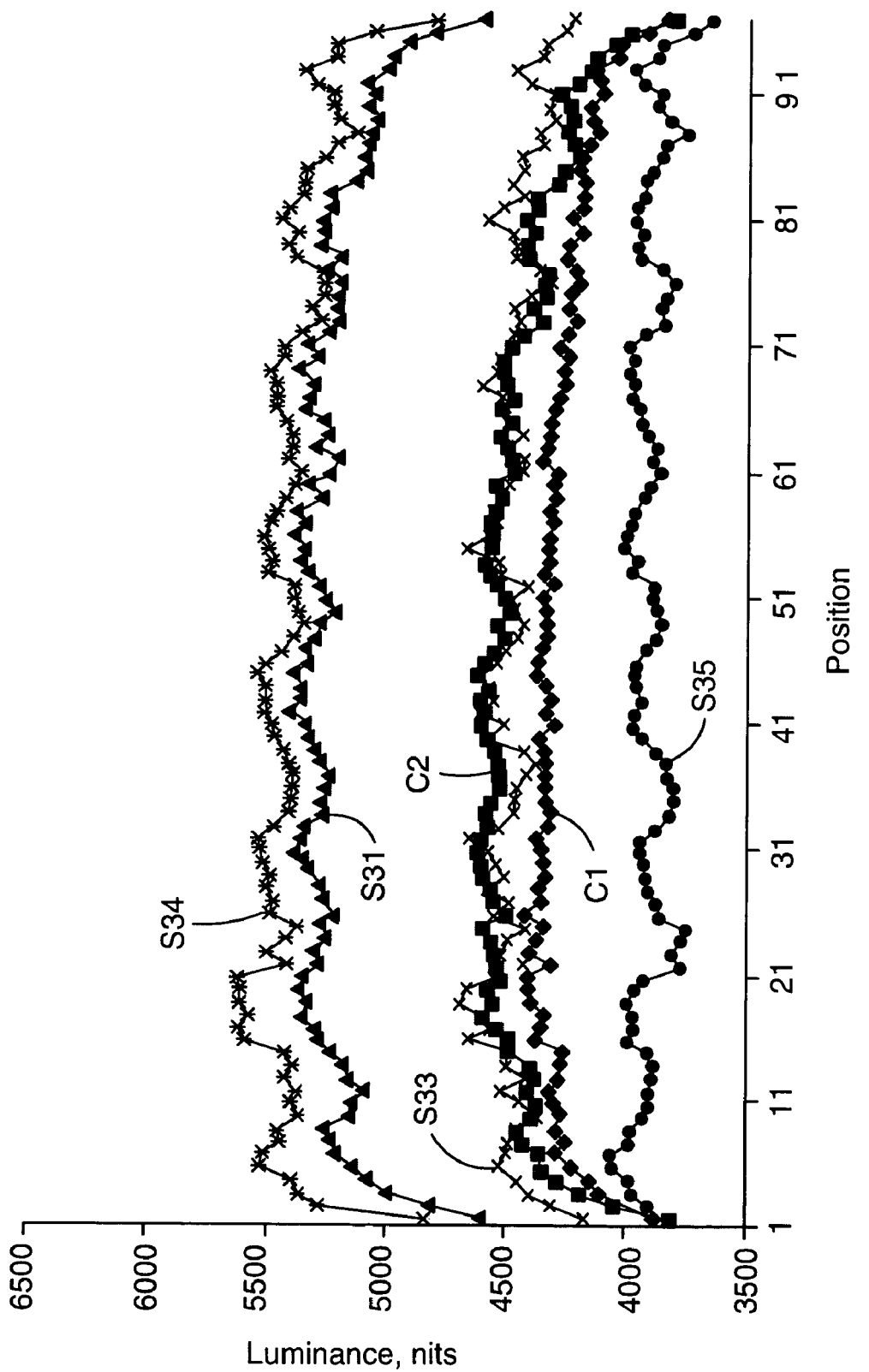
FIG. 13 presents a graph showing luminance as a function of position across a screen for two control samples and sample light management units S31, S33, S34 and S35.

The brightness/uniformity for samples S31, S33, S34, and S35 were 5207/54, 4456/70, 5346/76, and 3887/59 nits, respectively. The axial/integrated gain for S31, S33, S34, and S35 were 2.08/1.12, 1.84/0.96, 2.19/1.17, and 1.63/0.85, respectively. Examples S31, 33, and 34 possess optical performance that meets or exceeds C-1 and C-2. Optical performance characterization is displayed in Table I and in FIGS. 7, 8, and 13.

Examples S32, S36, and S38

Composite LMUs with BEF Inside and Polarizer on Bottom of Second Subassembly Example S32 was prepared using the same methods as described above for S29 except the substrate in the first subassembly had the diffuser layer on one side only, and the two subassemblies were annealed at 50° C. for 4 hours prior to attachment. The light management unit was not annealed after the first and second subassemblies were attached to each other.

Example S36 was the same as S32 except that the substrates used in the two subassemblies were 2 mm PMMA layers of (McMaster-Carr Inc., part no. 8589K22).

Example S38 was the same as S32 except the substrates used in the two subassemblies were 1 mm thick sheets of PC (Minnesota Plastics, LEX#-.4-S).

Figure 14:
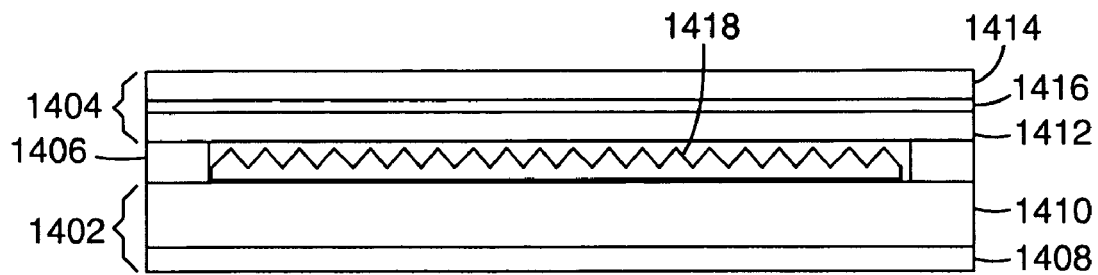
FIG. 14 schematically shows the structure of samples S32, S36, and S38.

A schematic diagram of the structure of S32, S36, and S38 is shown in FIG. 14. The samples were formed using the first subassembly 1402 and the second subassembly 1404, separated by the acrylic foam tape spacer 1406. The first subassembly 1402 included the 3635-70 diffuser layer 1408 attached to the substrate 1410. The second subassembly 1404 included the layer of DBEF-F 1412 attached to the float glass substrate 1414 via the adhesive layer 1416. The layer of BEF-3T 1418 was disposed between the two subassemblies 1402, 1404.

Figure 15:
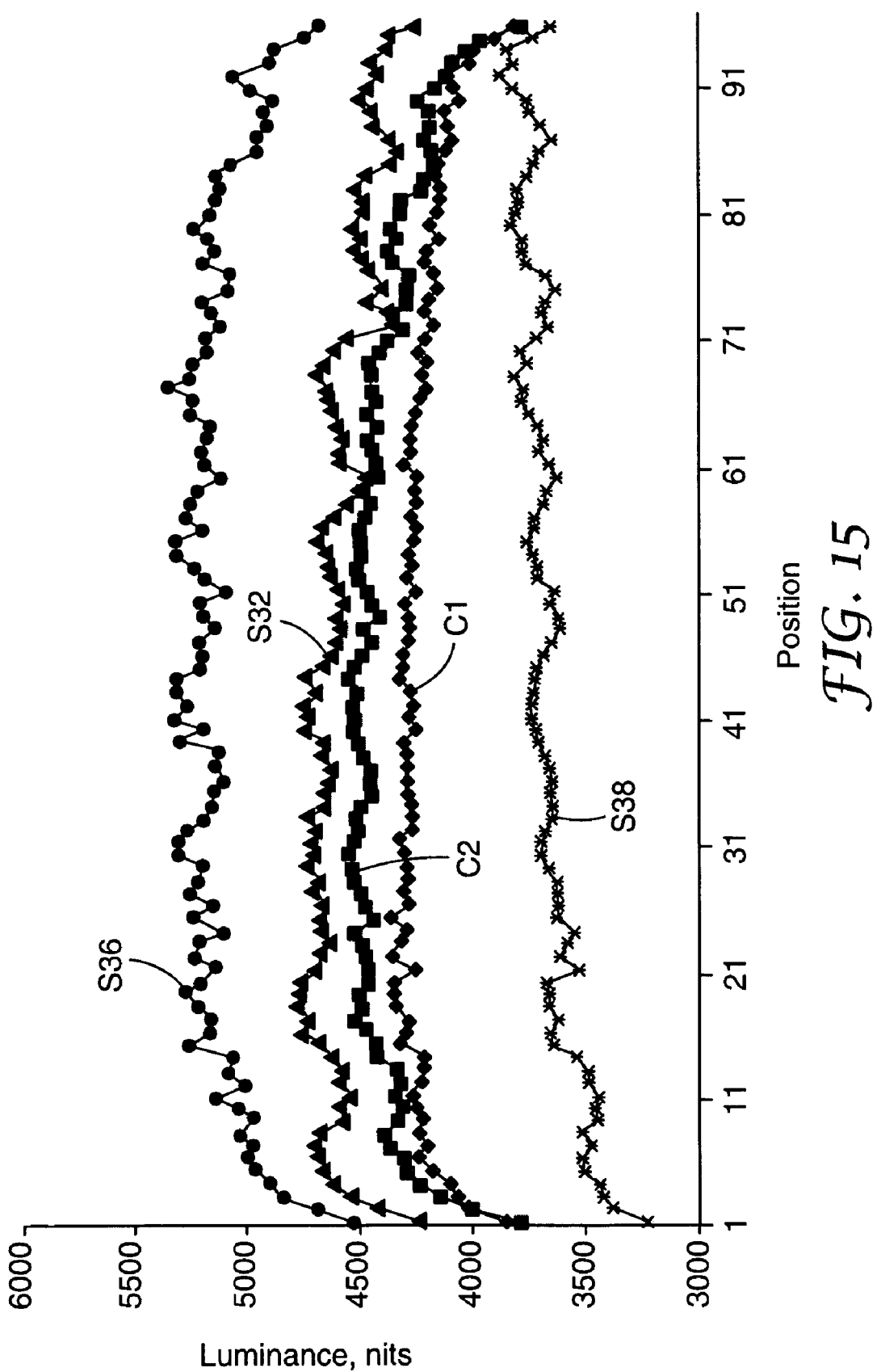
FIG. 15 presents a graph showing luminance as a function of position across a screen for two control samples and sample light management units S32, S36, and S38.

The brightness/uniformity for S32, S36, and S38 were 4686/57, 5216/67, and 3692/69 nits, respectively. The axial/integrated gain for S32, S36, and S38 was 2.20/1.40, 2.14/1.25, and 1.52/0.86, respectively. Examples S32, and S36 possess optical performance that meets or exceeds that of C1 and C2. The optical performance characterization is displayed in Table I and FIGS. 7, 8, and 15.

Examples S39-2 and S39-3

BEF Attached by Structured Surface

Example S39-2 was prepared using the same methods as described above for S32, except that the brightness enhancing film was attached by its structured surface to the reflecting polarizer layer via a 2 μm thick layer of an iso-octyl acrylate/acrylic acid/methyl acrylate-based adhesive, and the brightness enhancing film laterally extended over the AFT spacer. This arrangement of reflective polarizer and brightness enhancing layer is referred to as BUD-2. The first and second subassemblies were annealed at 50° C. for 4 hours prior to attachment to each other. The assembled light management unit was not annealed.

Example S39-3 was prepared using the same method as for S39-3 except that the layer of adhesive binding the brightness enhancing film to the reflective polarizer was 3 μm thick. This arrangement of reflective polarizer and brightness enhancing layer is referred to as BUD-3.

Figure 16:
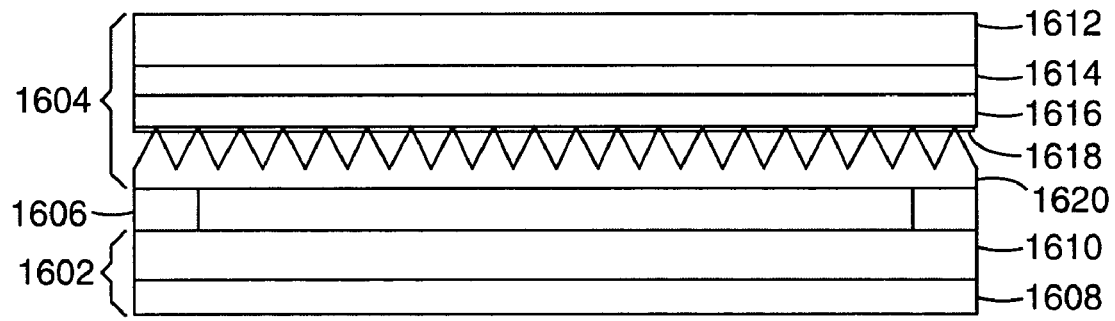
FIG. 16 schematically shows the structure of samples S39-2 and S39-3.

A schematic diagram showing the construction of examples S39-2 and S39-3 is shown in FIG. 16. The samples were formed with the first subassembly 1602 and the second subassembly 1604, separated by the acrylic foam tape spacer 1606. The first subassembly 1602 included the 3635-70 diffuser layer 1608 attached to the substrate 1610. The second subassembly 1604 included the substrate 1612 with a layer of adhesive 1614 attaching to the reflective polarizer 1616. The thin layer of adhesive 1618 on the lower side of the reflective polarizer 1616 was attached to the apexes of the prisms of the brightness enhancing layer 1620.

Figure 17:
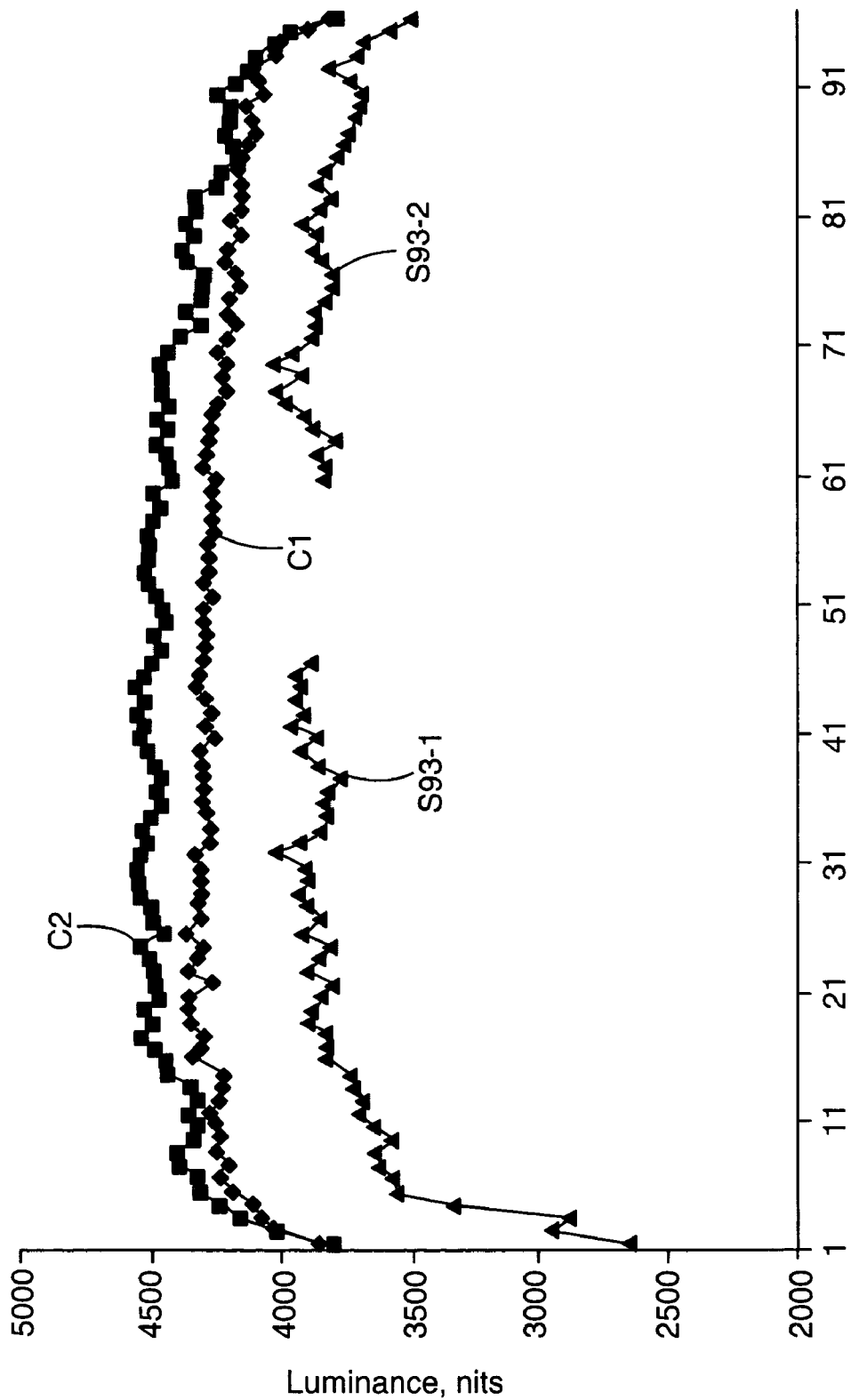
FIG. 17 presents a graph showing luminance as a function of position across a screen for two control samples and sample light management units S39-2 and S39-3.

The brightness/uniformity for examples S39-2 and S39-3 was 4070/56 and 4045/74 nits, respectively. The axial/integrated gain for examples S39-2 and S39-3 was 1.75/1.13 and 1.69/1.14, respectively. The optical performance characterization for these samples is listed in Table I and shown in FIGS. 7, 8, and 17.

Figure 18:
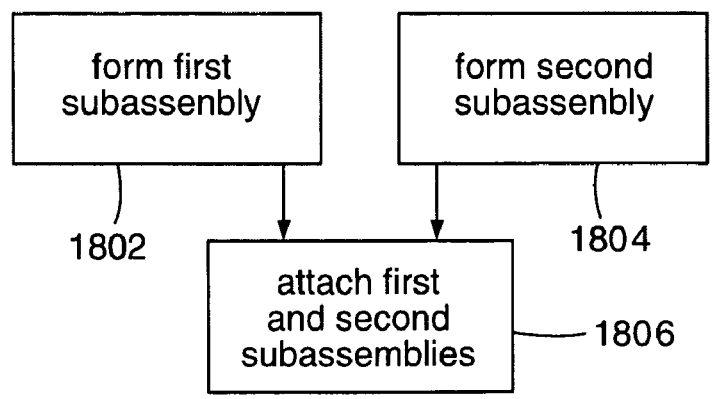
FIG. 18 presents a summary list of process steps for manufacturing a light management unit according to principles of the present invention.

The light management units of the present invention may be fabricated using different approaches. One particular approach is now discussed with reference to FIGS. 18-21. In this approach, as is shown in the method listed in FIG. 18, the two subassemblies are assembled individually in separate steps 1802 and 1804, before being attached together, step 1806.

One approach for forming a subassembly is now discussed with reference to FIGS. 19A and 19B. In this approach, a number of flexible films, for example a diffuser, reflective polarizer and/or brightness enhancing films are first laminated together. The films may be directly laminated together or may be laminated using one or more intermediate adhesive layers. In the illustrated embodiment, a first film 1902 and a second film 1904 are taken off respective rolls 1906 and 1908 and laminated in a lamination roll 1910, as schematically shown in FIG. 19A. The laminated web 1912 may then be wound on a rewinding roll 1914. The laminated web 1912 may be a laminate of two or more films.

The laminated web 1912 may then be wound off the rewinding roll 1914, as is schematically shown in FIG. 19B, and laminated onto a series of substrate panels 1916 via a second lamination roll 1918. A cutting edge 1920 may be used to kiss cut the laminated web 1912 as it comes off the rewinding roll 1914 so as to form a length of laminated sheet appropriate for lamination to the substrate panel 1916, thus forming a subassembly. In another approach, the cutting edge may be used to cut completely through the laminated web 1912.

Optionally, where only one sheet is to be laminated to the substrate, the sheet may be laminated directly to the substrate, in the manner illustrated in FIG. 19B, without the prior step of laminating different sheets together.

Another approach to fabricating a subassembly is now discussed with reference to FIGS. 20A and 20B. In this approach, a number of flexible films, for example, a diffuser film, a reflective polarizer layer and/or a brightness enhancing film are first laminated together. The films may be directly laminated together or may be laminated using one or more intermediate adhesive layers. In the illustrated embodiment, a first film 2052 and a second film 2054 are taken off respective rolls 2056 and 2058 and laminated in a lamination roll 2060, as is schematically illustrated in FIG. 20A. The resulting laminated web 2062 is then cut by a cutting tool 2064 into prepared laminate sheets 2066 of a desired length. The prepared laminate sheets 2066 may be formed into a stack 2068.

Individual laminate sheets 2066 from the stack 2068 may then be fed by a conveyor system onto respective substrate panels 2070. The conveyor system ensures that the laminate sheets 2066 are correctly aligned to their respective substrate panels 2070. The laminate sheets 2066 may then be laminated to the substrate panel 2070, for example using a laminate roll 2072, to form the subassembly.

Figure 21:
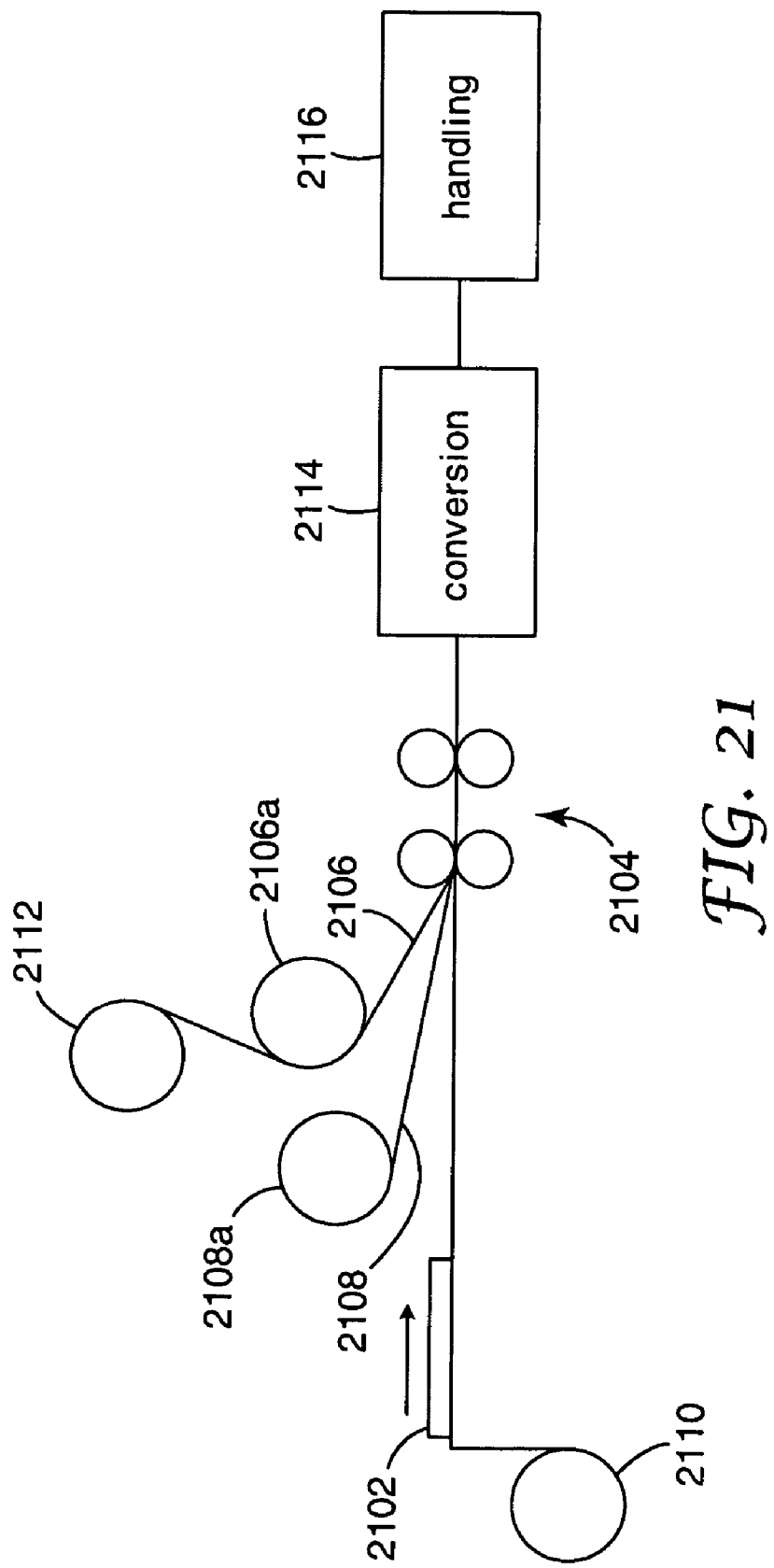
FIG. 21 schematically presents another embodiment of an arrangement for fabricating a subassembly according to principles of the present invention.

Another approach to fabricating a subassembly according to the present invention is now described with reference to FIG. 21. Substrate panels 2102 are fed to a lamination stage 2104 where they are laminated with a number of films. In the illustrated embodiment, the substrate panels 2102 are laminated with two films 2106, 2108 that may be removed from respective rolls 2106a, 2108a. The substrate panels 2102 may optionally have a premask removed before lamination, for example by removing the premask using a removal roll 2110. Likewise, at least one of the films 2106, 2108 may have a premask removed, for example by premask removal roller 2112.

There may be one or more films laminated to the panels 2102 at the same time. The films laminated to the panels 2102 may include a diffuser layer, a reflecting polarizer and/or a brightness enhancing layer. For example, the intermediate layer 2108 may be a diffuser layer, such as an acrylic foam tape, while the upper layer 2106 is a reflective polarizer or a brightness enhancing layer, or a pre-formed combination of reflective polarizer and brightness enhancing layer.

After passing through the lamination stage, the laminated subassemblies may optionally proceed to a conversion step 2114, for example, where film edges are trimmed and alignment notches are cut into the edges. After the conversion step, the subassemblies proceed to a handling stage 2116 where they are prepared for assembly into a light management unit.

Figure 22:
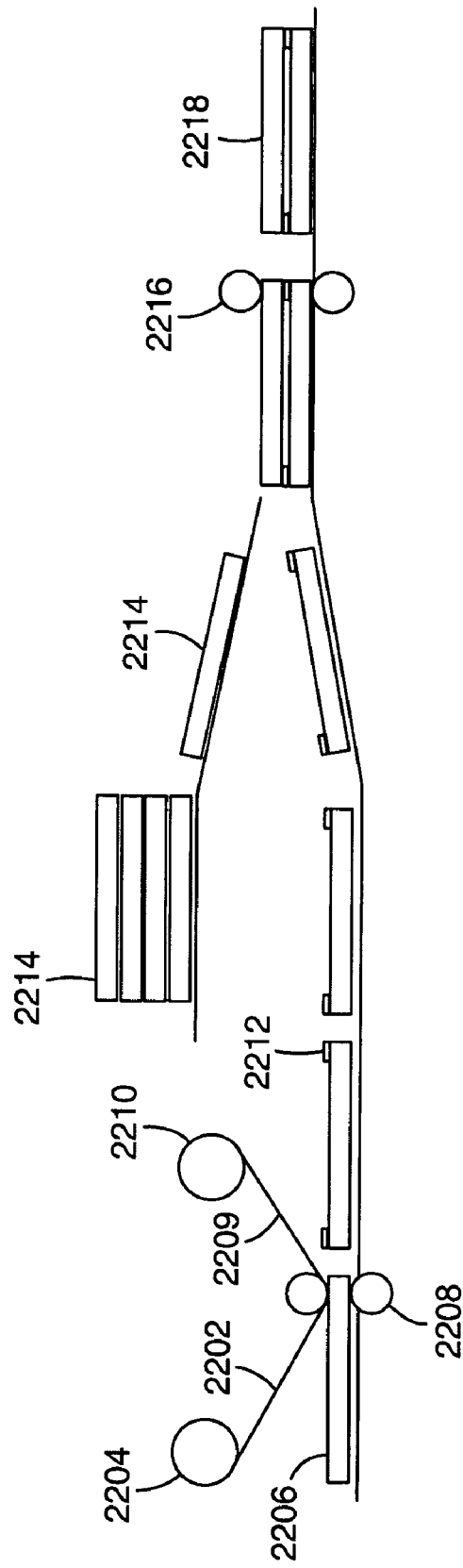
FIG. 22 schematically illustrates an embodiment of an arrangement for assembling a light management unit from pre-assembled subassemblies, according principles of the present invention.

One approach for assembling a light management unit from subassemblies is now discussed with reference to FIG. 22. A spacer layer 2202 is taken off a spacer layer roll 2204 and is laminated to a first subassembly 2206 by a first pair of lamination rollers 2208. A stripping roll 2210 strips off a backing 2209 from the spacer layer 2202, leaving the first subassembly 2206 with a spacer 2212 laminated in place. A second subassembly 2214 is then positioned on top of the spacer 2212, for example using a conveyor mechanism, and the package passes through a second lamination roll 2216 to form the light management unit 2218.

Another approach to making a subassembly according to the present invention is now discussed with reference to FIGS. 23A and 23B. In this approach, a number of flexible films, for example a diffuser, reflective polarizer and/or brightness enhancing films are first laminated together, prior to lamination to the substrate. The films may be directly laminated together or may be laminated using one or more intermediate adhesive layers. This approach may be used to make, for example, the embodiments of subassembly illustrated in FIGS. 3G-3I.

Figure 23A:
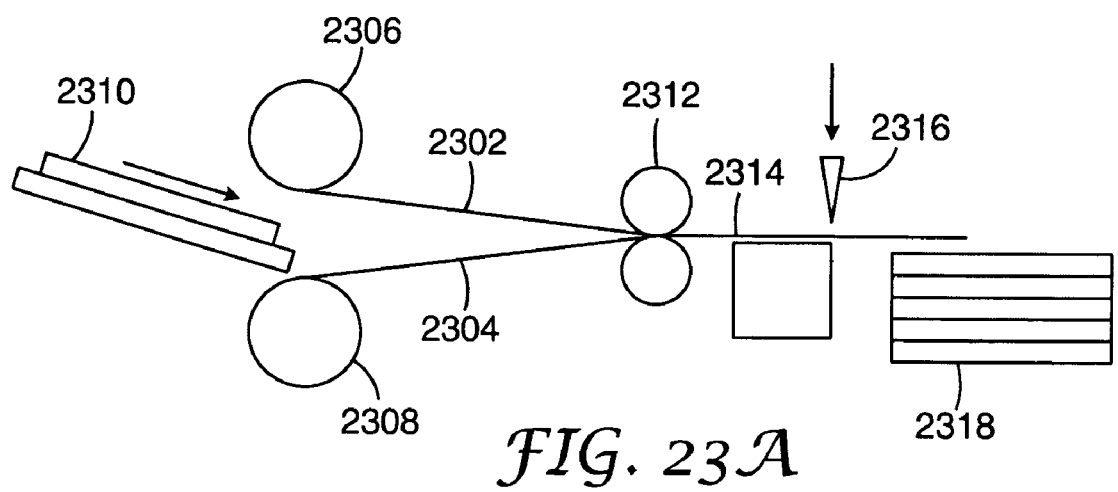
FIGS. 23A and 23B schematically present other embodiments of arrangements for fabricating a subassembly according to principles of the present invention.

In the approach illustrated in FIG. 23A, a first film 2302, for example a diffuser sheet, and a second film 2304, for example a brightness enhancing film, are taken off respective rolls 2306 and 2308 and an intermediate layer 2310 is placed as a sheet between the two films 2302 and 2304. The three layers 2302, 2304 and 2310 are laminated together in the lamination roll 2312 to form a laminated web 2314. The laminated web 2314 is then cut into sheets by a cutting edge 2316 to form a stack of laminated sheets 2318. The laminated sheets 2318 may then be applied to respective substrates, for example in a process similar to that shown in FIG. 20B.

Figure 23B:
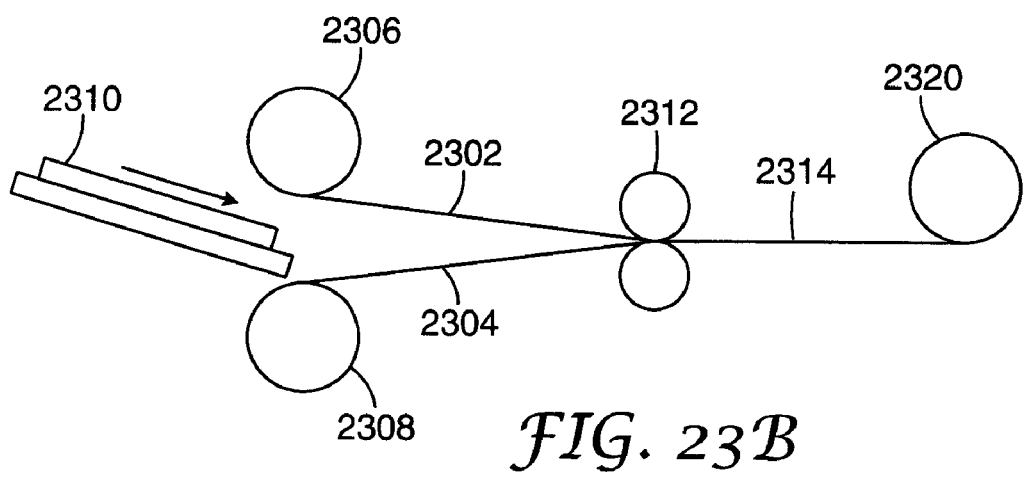

In a variation of this process, shown in FIG. 23B, the laminated web 2314 is rewound onto a roll 2320 instead of being cut into separate sheets. The rolled, laminated web 2314 may then be applied to substrates, for example using a method similar to that illustrated in FIG. 19B.

Diffuser Transmission vs. Illuminance Uniformity

A study of the illuminance uniformity was made for values of diffuser single-pass transmission in the range of about 77%-92%. This is the value of the single pass transmission averaged across the diffuser. Where the diffuser has a uniform diffusion characteristic, the transmission at any one point is equal to the spatially averaged transmission. Where the diffuser has a non-uniform diffusion characteristic, i.e. as with a printed pattern diffuser, the transmission at any one point need not be the same as the spatially averaged transmission.

Various sample light management units having a single LCD glass substrate, 1 mm thick, were made with varying numbers of layers of the Scotchcal™ ElectroCut™ Graphic Film, type 7725-314 diffusive layer. Sample S1 had a single layer of the 7725-314 diffuser. Samples S1a-S1d had 2-5 layers of the diffuser on each side of the substrate (4-10 layers total), respectively. Sample S5 had a single layer of the 7725-314 diffuser on each side. Sample S2 had a single layer of the Scotchcal™ 3635-70 diffuser film on one side of the substrate. These samples are described in greater detail in co-owned, co-pending U.S. patent application Ser. No. 10/966,610, titled "DIRECT-LIT LIQUID CRYSTAL DISPLAYS WITH LAMINATED DIFFUSER PLATES", filed on even date herewith. The performance of these samples, is listed in Table III below.

TABLE III

Uniformity Study For High Transmission Diffusers

| Sample | T % | x, nits | σ, nits | σ/x % |
|---|---|---|---|---|
| C1 | 56.8 | 4345 | 38 | 0.87 |
| C2 | 70 | 4590 | 49 | 1.08 |
| S1 | 92.3 | 4521 | 88 | 1.94 |
| S5 | 86.8 | 4412 | 46 | 1.05 |
| S2 | 62 | 4351 | 45 | 1.04 |
| S1a | 85.7 | 4282 | 44 | 1.02 |
| S1b | 83.1 | 4104 | 37 | 0.91 |
| S1c | 80.1 | 3934 | 37 | 0.95 |
| S1d | 77.2 | 3800 | 35 | 0.93 |

Figure 24:
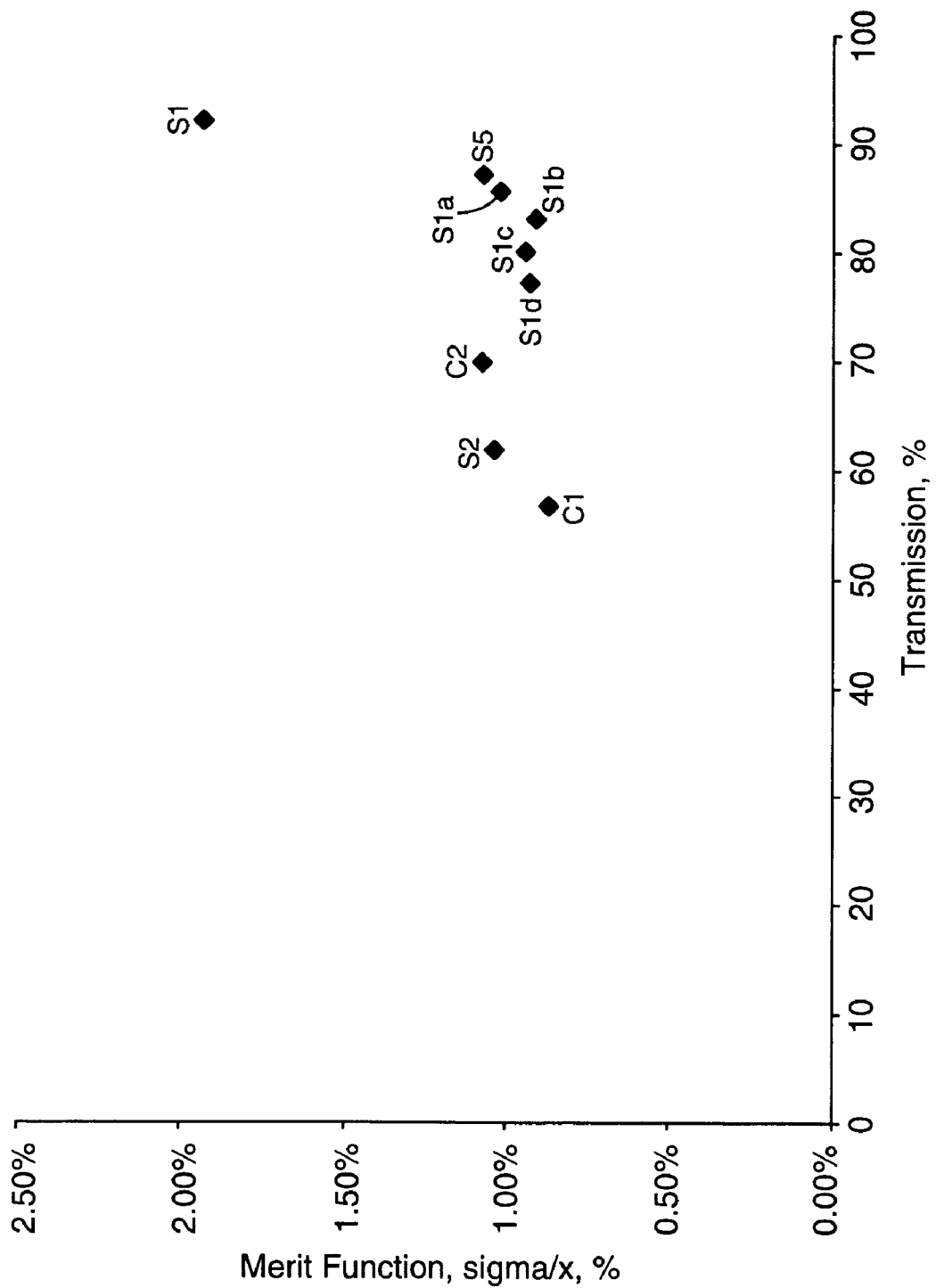
FIG. 24 presents a graph showing brightness uniformity plotted as a function of single pass transmission through the diffuser plate for several sample uniform light management units and for a printed diffuser plate.

These results for σ/x are also shown in FIG. 24 as a function of single pass transmission, T. The 7725-314 diffusive layer had an absorption of around 2%, and so the transmission for samples S1a-S1d was reduced relative to the transmission of S1. However, the value of σ/x was very good, in most cases being less than 1%, which shows that a uniform diffuser layer can provide uniformity values approaching that of a patterned diffuser.

Conventional wisdom holds that increased illumination uniformity is achieved using relatively high levels of diffusion, which means relatively lower single pass transmission, typically around 70% or lower. The results presented in FIG. 24 show that the conventional wisdom is misleading when the diffuser is used in conjunction with a brightness enhancing layer, and that high illumination uniformity can be achieved using a uniform diffuser having a single pass transmission higher than 70%. In fact, where the diffuser is uniform, the relative uniformity is maximum in the range 75%-90%. It is believed that high levels of uniformity are possible with high diffuse transmission because the brightness enhancing layer interacts preferentially with light diffused by the diffuser at certain angles. Accordingly, preferred values of single pass transmission in the diffuser plate may be greater than 75%, 80%, or 85%, and ranges of single pass transmission may lie in the range 72%-95%, more preferably in the range 75%-90%. These single pass transmission values correspond to the single pass transmission through the combination of all diffuser layers present in the set of light management films disposed between the light source(s) and the LCD panel.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. For example, the use of the a light management unit as described herein does not preclude the use of free standing optical films between the backlight and the optical subassemblies or between the optical subassemblies and the LCD panel. The claims are intended to cover such modifications and devices.

We claim:

1. A light management unit for use between a light source and a liquid crystal display panel, comprising:
   a first optical subassembly comprising at least a first substrate, the first optical subassembly also comprising one or more diffusing elements;
   a second optical subassembly comprising at least a second substrate; and
   a spacer positioned between the first and second subassemblies, the spacer spacing the first and second subassemblies apart to define the gap, the second optical subassembly being mounted to the first subassembly, wherein the spacer is formed of an adhesive foam tape adhering to the first and second subassemblies.

2. A unit as recited in claim 1, wherein the one or more diffusing elements comprise at least a first diffuser layer.

3. A unit as recited in claim 2, wherein the first diffuser layer is attached to the first substrate via an adhesive layer disposed between the first diffuser layer and the first substrate.

4. A unit as recited in claim 2, wherein the first diffuser layer is provided on a side of the first substrate facing towards the second subassembly, and the first subassembly comprises a second diffuser layer provided to a side of the first substrate facing away from the second subassembly.

5. A unit as recited in claim 1, wherein the first optical subassembly provides a diffusion characteristic that is uniform across the width of the first optical subassembly.

6. A unit as recited in claim 1, wherein the one or more diffusing elements comprises the first substrate, the first substrate being a bulk diffuser plate.

7. A unit as recited in claim 1, at least one of a reflective polarizer and a brightness enhancing layer being attached to either the first or second optical subassembly or being disposed in the gap between the first and second optical subassemblies.

8. A unit as recited in claim 7, wherein the second optical subassembly comprises the brightness enhancing layer.

9. A unit as recited in claim 8, wherein the second optical subassembly comprises the reflective polarizer.

10. A unit as recited in claim 7, wherein the second optical subassembly comprises the reflective polarizer.

11. A unit as recited in claim 1, wherein the single pass optical transmission through the one or more diffusing elements is in the range from about 72%-95%.

12. A unit as recited in claim 11, wherein the range is from about 75%-90%.

13. A unit as recited in claim 1, wherein the spacer is positioned along peripheral edges of respective surfaces of the first and second subassemblies.

14. A display system, comprising:
   a backlight;
   a liquid crystal display (LCD) panel comprising upper and lower plates and a liquid crystal layer disposed between the upper and lower plates; and
   a light management unit disposed between the backlight and the LCD panel, the light management unit having a first optical subassembly comprising a first substrate and a second optical subassembly comprising a second substrate; and
   a spacer positioned between the first and second subassemblies, the spacer spacing the first and second subassemblies apart to define the gap, the second optical subassembly being mounted to the first subassembly, wherein the spacer is formed of an adhesive foam tape adhering to the first and second subassemblies, the light management unit diffusing light passing from the backlight to the LCD panel.

15. A system as recited in claim 14, wherein the backlight comprises a plurality of light sources disposed between a reflector and the first optical subassembly.

16. A system as recited in claim 15, wherein the light sources comprise fluorescent lamps.

17. A system as recited in claim 14, wherein the liquid crystal display panel comprises first and second absorbing polarizers on respective first and second sides.

18. A system as recited in claim 14, wherein the first light management unit comprises at least a first diffuser layer.

19. A system as recited in claim 18, wherein the first diffuser layer is attached to the first substrate via an adhesive layer disposed between the first diffuser layer and the first substrate.

20. A system as recited in claim 18, wherein the first diffuser layer is provided on one side of the first substrate and the first optical subassembly comprises a second diffuser layer provided on a second side of the first substrate.

21. A system as recited in claim 14, wherein the first substrate comprises a bulk diffuser plate.

22. A system as recited in claim 14, wherein the light management unit provides a diffusion characteristic that is substantially uniform across its width.

23. A system as recited in claim 14, wherein the first optical subassembly comprises a brightness enhancing layer.

24. A system as recited in claim 14, wherein the second optical subassembly comprises a brightness enhancing layer.

25. A system as recited in claim 14, wherein the second optical subassembly comprises a reflective polarizer.

26. A system as recited in claim 14, wherein the light management unit further comprises a brightness enhancing layer and a reflective polarizer.

27. A system as recited in claim 26, wherein the brightness enhancing layer and the reflective polarizer are in the same optical subassembly.

28. A system as recited in claim 26, wherein the brightness enhancing layer and the reflective polarizer are in different optical subassemblies.

29. A system as recited in claim 14, wherein the light management unit comprises at least one diffusing element to diffuse light passing from the backlight to the LCD panel, the single pass optical transmission through the at least one diffusing element is in the range from about 72%-95%.

30. A system as recited in claim 29, wherein the range is from about 75%-90%.

31. A system as recited in claim 14, further comprising a spacer positioned between the first and second optical subassemblies, the spacer spacing the first and second subassemblies apart to define the gap.

32. A system as recited in claim 31, wherein the spacer adhesively holds the first and second subassemblies together.

33. A system as recited in claim 31, wherein the spacer is positioned along peripheral edges of respective surfaces of the first and second subassemblies.

34. A system as recited in claim 14, wherein a value of $\sigma/I$ for light between the light management unit and the LCD panel is less than 1.5%, where I is the level of illumination light passing from the light management unit to the LCD panel, averaged across the LCD panel, and σ is the root mean square deviation in the level of illumination light entering the LCD panel.

35. A system as recited in claim 34, wherein the value of $\sigma/I$ is less than 1.3%.

36. A system as recited in claim 14, further comprising a controller coupled to control an image displayed by the LCD panel.

37. A system as recited in claim 36, wherein the controller comprises a computer.

38. A system as recited in claim 36, wherein the controller comprises a television controller.

* * * * *

UNITED STATES PATENT AND TRADEMARK OFFICE
CERTIFICATE OF CORRECTION

PATENT NO. : 7,436,469 B2  Page 1 of 1
APPLICATION NO. : 10/965937
DATED : October 14, 2008
INVENTOR(S) : Mark D. Gehlsen It is certified that error appears in the above-identified patent and that said Letters Patent is hereby corrected as shown below:

<u>Column 3,</u>
Line 28, after "according" insert --to--.

<u>Column 4,</u>
Line 15, delete "doe" and insert --does--, therefor.

<u>Column 6,</u>
Line 13, after "of" delete "a".

<u>Column 19,</u>
Line 47, delete "(1)" and insert --(C1)--, therefor.

<u>Column 28,</u>
Line 44, delete "different." and insert --different--, therefor.
Line 67, delete "a" and insert --σ--, therefor.

Signed and Sealed this

Seventeenth Day of March, 2009

JOHN DOLL
*Acting Director of the United States Patent and Trademark Office*